United States Patent [19]
Hiratsuka et al.

[11] Patent Number: 5,287,209
[45] Date of Patent: Feb. 15, 1994

[54] IMAGE FORMING DEVICE FOR ENHANCING TONE REPRODUCTION BY CHANGING DOT SIZE

[75] Inventors: Seiichiro Hiratsuka; Yuji Toyomura; Keiichi Nakashima, all of Fukuoka, Japan

[73] Assignee: Matsushita Electric Industrial Co., Ltd., Osaka, Japan

[21] Appl. No.: 772,829

[22] Filed: Oct. 7, 1991

[30] Foreign Application Priority Data

Oct. 9, 1990 [JP] Japan .................. 2-271098
Jan. 21, 1991 [JP] Japan .................. 3-5458
Jan. 21, 1991 [JP] Japan .................. 3-5468
Feb. 25, 1991 [JP] Japan .................. 3-29895
Mar. 11, 1991 [JP] Japan .................. 3-45164

[51] Int. Cl.$^5$ .................. G06F 3/12; G06F 15/66
[52] U.S. Cl. .................. 395/109; 358/459; 358/458
[58] Field of Search .................. 364/DIG. 1, DIG. 2; 395/109, 100, 108; 358/456, 457, 448, 458, 459

[56] References Cited

U.S. PATENT DOCUMENTS 4,491,875 1/1985 Kawamura .
4,651,287 3/1987 Tsao .................. 395/109
4,701,811 10/1987 Moriguchi et al. .
4,709,149 11/1987 Takahashi et al. .

FOREIGN PATENT DOCUMENTS 61-154270 7/1986 Japan .
64-57876 3/1989 Japan .
2016853 9/1979 United Kingdom .

*Primary Examiner*—Robert L. Richardson
*Attorney, Agent, or Firm*—Lowe, Price, LeBlanc & Becker

[57] ABSTRACT

An image forming device which perform tone reproduction of a by changing the size of dots according to input image data comprising a plurality of pixels, each of which has an image density. A block partitioning portion partitions the input image data into blocks, each of which has a predetermined number of pixels and each of the pixels having a predetermined position within each of the blocks. A tone modulation portion determines priorities corresponding to predetermined positions of the pixels within each of the blocks and changes the size of the dots according to the image densities of the pixels within the block. The tone modulation portion increases the size of the dots corresponding to the pixels in such a manner that the size of one of the dots corresponding to one of the pixels is larger than that of another one of the dots corresponding to another one of the pixels having a lower priority than one of the pixels but having the same image density. The degradation of resolution and moire effects are avoided.

30 Claims, 18 Drawing Sheets

FIG. 5

| | ADDRESS | CONTENTS | INPUT SIGNAL DATA | ADDRESS | CONTENTS | INPUT SIGNAL DATA | |
|---|---|---|---|---|---|---|---|
| TTB CORRES. TO POSITION A | 000H | 00H | 00H | 100H | 00H | 00H | TTB CORRES. TO POSITION C |
| | 001H | 02H | 01H | 101H | 00H | 01H | |
| | 002H | 04H | 02H | 102H | 00H | 02H | |
| | ⋮ | ⋮ | ⋮ | ⋮ | ⋮ | ⋮ | |
| | 03EH | BBH | 3EH | 13EH | 00H | 3EH | |
| | 03FH | BDH | 3FH | 13FH | 00H | 3FH | |
| | 040H | BFH | 40H | 140H | 00H | 40H | |
| | ⋮ | ⋮ | ⋮ | ⋮ | ⋮ | ⋮ | |
| | 07EH | BFH | 7EH | 17EH | 10H | 7EH | |
| | 07FH | BFH | 7FH | 17FH | 12H | 7FH | |
| | 080H | BFH | 80H | 180H | 14H | 80H | |
| | ⋮ | ⋮ | ⋮ | ⋮ | ⋮ | ⋮ | |
| | 0BEH | BFH | BEH | 1BEH | BBH | BEH | |
| | 0BFH | BFH | BFH | 1BFH | BDH | BFH | |
| | 0C0H | BFH | C0H | 1C0H | BFH | C0H | |
| | ⋮ | ⋮ | ⋮ | ⋮ | ⋮ | ⋮ | |
| | 0FDH | FFH | FDH | 1FDH | FFH | FDH | |
| | 0FEH | FFH | FEH | 1FEH | FFH | FEH | |
| | 0FFH | FFH | FFH | 1FFH | FFH | FFH | |
| TTB CORRES. TO POSITION B | 200H | 00H | 00H | 300H | 00H | 00H | TTB CORRES. TO POSITION D |
| | 201H | 00H | 01H | 301H | 00H | 01H | |
| | 202H | 00H | 02H | 302H | 00H | 02H | |
| | ⋮ | ⋮ | ⋮ | ⋮ | ⋮ | ⋮ | |
| | 23EH | 10H | 3EH | 33EH | 00H | 3EH | |
| | 23FH | 12H | 3FH | 33FH | 00H | 3FH | |
| | 240H | 14H | 40H | 340H | 00H | 40H | |
| | ⋮ | ⋮ | ⋮ | ⋮ | ⋮ | ⋮ | |
| | 27EH | FCH | 7EH | 37EH | 00H | 7EH | |
| | 27FH | FFH | 7FH | 37FH | 00H | 7FH | |
| | 280H | FFH | 80H | 380H | 00H | 80H | |
| | ⋮ | ⋮ | ⋮ | ⋮ | ⋮ | ⋮ | |
| | 2BEH | FFH | BEH | 3BEH | 10H | BEH | |
| | 2BFH | FFH | BFH | 3BFH | 12H | BFH | |
| | 2C0H | FFH | C0H | 3C0H | 14H | C0H | |
| | ⋮ | ⋮ | ⋮ | ⋮ | ⋮ | ⋮ | |
| | 2FDH | FFH | FDH | 3FDH | FCH | FDH | |
| | 2FEH | FFH | FEH | 3FEH | FFH | FEH | |
| | 2FFH | FFH | FFH | 3FFH | FFH | FFH | |

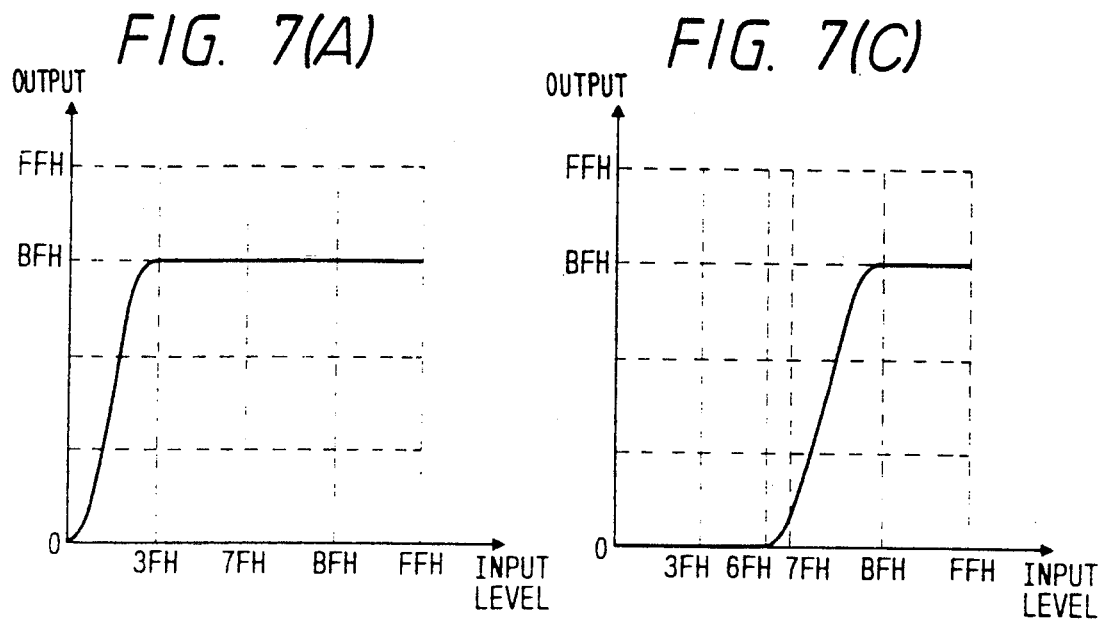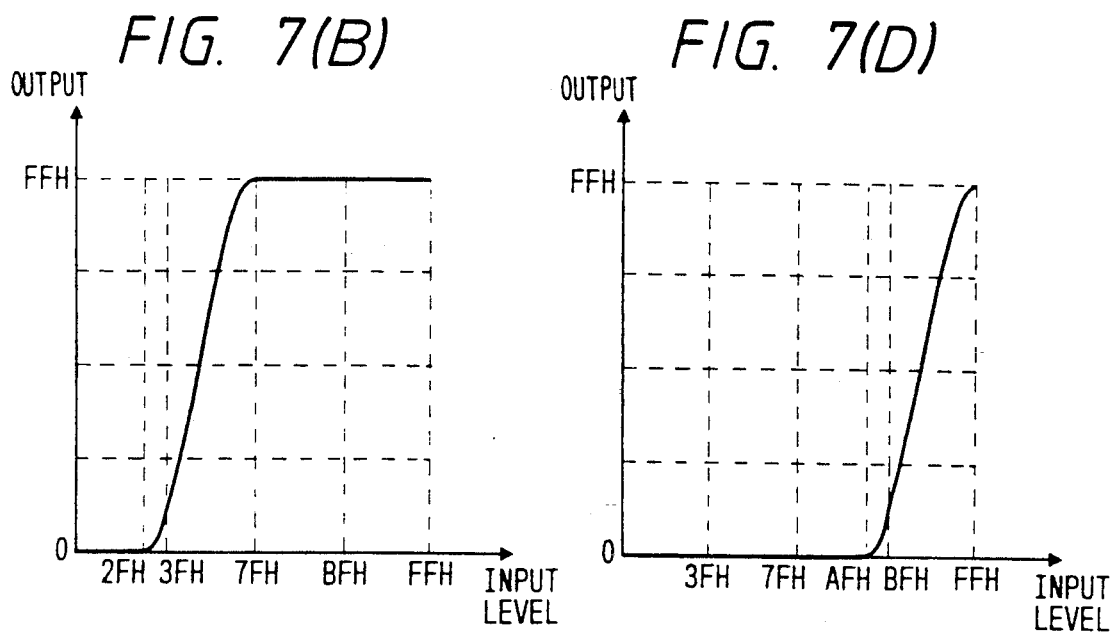

| ADDRESS | | INPUT SIGNAL DATA | |
|---|---|---|---|
| 00H | 00H | 00H | |
| 01H | 01H | 01H | |
| 02H | 03H | 02H | |
| ⋮ | ⋮ | ⋮ | |
| 7DH | FDH | 7DH | EVEN LINE |
| 7EH | FEH | 7EH | |
| 7FH | FFH | 7FH | |
| ⋮ | ⋮ | ⋮ | |
| FDH | FFH | FDH | |
| FEH | FFH | FEH | |
| FFH | FFH | FFH | |
| 100H | 00H | 00H | |
| 101H | 00H | 01H | |
| 102H | 00H | 02H | |
| ⋮ | ⋮ | ⋮ | |
| 17DH | 08H | 7DH | ODD LINE |
| 17EH | 09H | 7EH | |
| 17FH | 0BH | 7FH | |
| ⋮ | ⋮ | ⋮ | |
| 1FDH | FCH | FDH | |
| 1FEH | FDH | FEH | |
| 1FFH | FFH | FFH | |

FIG. 14

Tone Trans Table Corres. to Position A

| Address | Contents | Input Signal Data |
|---|---|---|
| 000H | 00H | 00H |
| 001H | 02H | 01H |
| 002H | 04H | 02H |
| ⋮ | ⋮ | ⋮ |
| 03EH | FBH | S1H |
| 03FH | FDH | S2H |
| 040H | FFH | S3H |
| ⋮ | ⋮ | ⋮ |
| 07EH | FFH | A4H |
| 07FH | FFH | A5H |
| 080H | FFH | A6H |
| ⋮ | ⋮ | ⋮ |
| 0BEH | FFH | F7H |
| 0BFH | FFH | F8H |
| 0C0H | FFH | F9H |
| ⋮ | ⋮ | ⋮ |
| 0FDH | FFH | FDH |
| 0FEH | FFH | FEH |
| 0FFH | FFH | FFH |

Tone Trans Table Corres. to Position C

| Address | Contents | Input Signal Data |
|---|---|---|
| 100H | 00H | 00H |
| 101H | 00H | 01H |
| 102H | 00H | 02H |
| ⋮ | ⋮ | ⋮ |
| 13EH | 00H | S1H |
| 13FH | 00H | S2H |
| 140H | 00H | S3H |
| ⋮ | ⋮ | ⋮ |
| 17EH | 00H | A4H |
| 17FH | 02H | A5H |
| 180H | 04H | A6H |
| ⋮ | ⋮ | ⋮ |
| 1BEH | FBH | F7H |
| 1BFH | FDH | F8H |
| 1C0H | FFH | F9H |
| ⋮ | ⋮ | ⋮ |
| 1FDH | FFH | FDH |
| 1FEH | FFH | FEH |
| 1FFH | FFH | FFH |

Tone Trans Table Corres. to Position B

| Address | Contents | Input Signal Data |
|---|---|---|
| 200H | 00H | 00H |
| 201H | 00H | 01H |
| 202H | 00H | 02H |
| ⋮ | ⋮ | ⋮ |
| 23EH | 00H | S1H |
| 23FH | 02H | S2H |
| 240H | 04H | S3H |
| ⋮ | ⋮ | ⋮ |
| 27EH | FBH | A4H |
| 27FH | FDH | A5H |
| 280H | FFH | A6H |
| ⋮ | ⋮ | ⋮ |
| 2BEH | FFH | F7H |
| 2BFH | FFH | F8H |
| 2C0H | FFH | F9H |
| ⋮ | ⋮ | ⋮ |
| 2FDH | FFH | FDH |
| 2FEH | FFH | FEH |
| 2FFH | FFH | FFH |

Tone Trans Table Corres. to Position D

| Address | Contents | Input Signal Data |
|---|---|---|
| 300H | 00H | 00H |
| 301H | 00H | 01H |
| 302H | 00H | 02H |
| ⋮ | ⋮ | ⋮ |
| 33EH | 00H | S1H |
| 33FH | 00H | S2H |
| 340H | 00H | S3H |
| ⋮ | ⋮ | ⋮ |
| 37EH | 00H | A4H |
| 37FH | 00H | A5H |
| 380H | 00H | A6H |
| ⋮ | ⋮ | ⋮ |
| 3BEH | 00H | F7H |
| 3BFH | 00H | F8H |
| 3C0H | FFH | F9H |
| ⋮ | ⋮ | ⋮ |
| 3FDH | FFH | FDH |
| 3FEH | FFH | FEH |
| 3FFH | FFH | FFH |

Y (YELLOW)

M (MAGENTA)

C (CYAN)

BK (BLACK)

FIG. 24
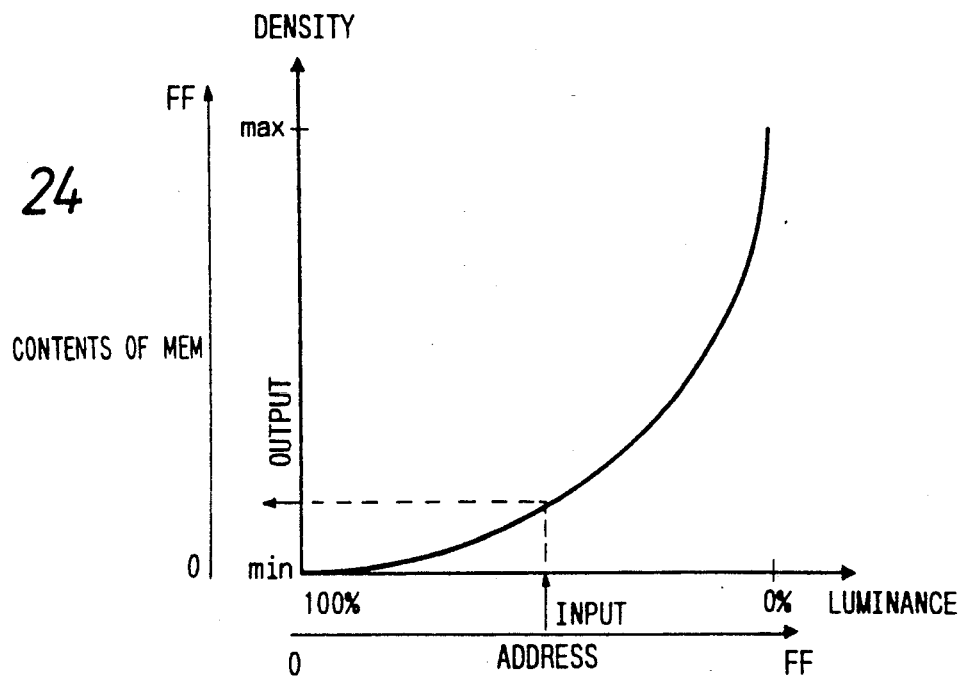
FIG. 25
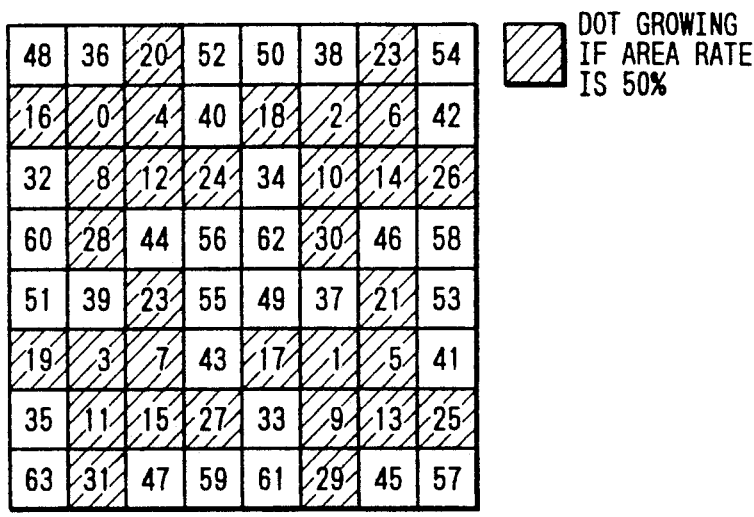
FIG. 26
| DENSITY LEVEL SIGNAL 10 | H | 0 | 0 | 1 | 1 | 0 | 0 | 1 | 1 |
|---|---|---|---|---|---|---|---|---|---|
| | L | 0 | 1 | 0 | 1 | 0 | 1 | 0 | 1 |
| RESULT OF COMPN 11 | | 0 | 0 | 0 | 0 | 1 | 1 | 1 | 1 |
| FINAL OUTPUT 13 | | 00H | 3FH | 7FH | BFH | 3FH | 7FH | BFH | FFH |
H: HIGHER ORDER    L: LOWER ORDER    COMPN: COMPARISON

IMAGE FORMING DEVICE FOR ENHANCING TONE REPRODUCTION BY CHANGING DOT SIZE

BACKGROUND OF THE INVENTION

Field of The Invention

This invention generally relates to an image forming device for recording a high-picture-quality image and more particularly to an image forming device for performing tone reproduction (namely, gradational recording) of an image by changing the size of dots according to input image data.

Description of The Related Art

Various conventional printers have been proposed according to diverse principles as an output terminal for a personal computer, a workstation or the like. Especially, laser beam printers (hereunder abbreviated as LBPS) each employing an electrophotography process and laser techniques excel in a recording speed and print quality and thus have rapidly come into wide use.

Meanwhile, there has been an upsurge in demand for a full color LBP in the market. In case of a full color LBP, however, image data becomes an object to be outputted, in addition to conventional objects such as characters and line drawings. Thus the full color LBP requires multi-gray-level output techniques as a prerequisite for full color image processing, while a conventional ordinary LBP processes mere a binary image.

Generally, in cases of image output equipments such as LBPS, to which an electrophotography process is applied, the number of gray levels (hereunder sometimes referred to as tone levels) by which a clear output image therefrom can be stably obtained is only three or four at most. This is owing to instability of results of the electrophotography itself.

For example, a binary dither method is often used for recording a half-tone image by means of an image output equipment such as a conventional LBP and an ordinary thermal transfer printer, which has an insufficient number of tone levels for obtaining a clear output image. The binary dither method, however, requires using a dithering matrix of large size for obtaining sufficient tone reproduction and further has drawbacks in that resolution is reduced and in that degradation of picture quality occurs, for instance, a moire fringe is generated due to an interference between half-tone dots of a manuscript and dithering patterns.

A multi-level dither method has been proposed for eliminating the above described drawbacks of the binary dither method. Hereinafter, the multi-level dither method will be described by referring to FIG. 23 which illustrates the construction of an image processor. Incidentally, it is assumed for simplicity of description that image data to be stored or transferred is already stored in an image memory 1.

In an image memory 1, luminance data respectively corresponding to red R, green G and blue B (hereunder sometimes referred to simply as luminance data R, G and B, respectively) are stored. Each pixel has such luminance data R, G and B and thus has an information content (namely, quantity of information or information volume) of 8 bits/pixel×3=24 bits/pixel. Such luminance data R, G and B corresponding to each pixel are accessed by a primary scanning direction counter 2 and a subordinate scanning direction counter 3 through an address calculating portion 4. Then, each piece of the luminance data R, G and B corresponding to each pixel (hereinafter sometimes referred to as pixel data) is read from the head or leading address thereof.

The luminance data R, G and B are represented by luminance signals. Further, the luminance signals are transformed in a density transforming portion 5 into density signals respectively representing subtractive primaries or primary colors employed in the field of printing, namely, cyan C, magenta M and yellow Y. This transformation (hereunder referred to as the density transformation) is performed by establishing a transformation table in a storage device, which may be usually a read-only-memory (ROM), a random-access-memory (RAM) or the like, and then accessing the transformation table by using the luminance data as addresses. Practically, values determined on the basis of transformation characteristics as illustrated in a graph of FIG. 24 are employed as the contents of the transformation table and are written into the transformation table. Incidentally, the horizontal axis represents luminance and addresses and the vertical axis denotes densities and the values to be employed and written as the contents of the transformation table.

Subsequently, the data (hereinafter referred to as the density data) obtained a& the density transformation of the pixel data and respectively corresponding to the subtractive primaries are inputted to a color correction portion 6. This color correction portion 6 performs a well-known under color removal (UCR) operation, a black-printing producing operation and a masking operation on the density data. Thus image data corresponding to black Bk is added by the color correction portion 6 to the density data C, M and Y (hereinafter the data C, M, Y and Bk will be sometimes referred to as four-color data). Therefore, the actual quantity of Information corresponding to each pixel actually becomes 8 bits/pixel×4=32 bits/pixel.

Next, the four-color data are transferred by a data selector 7 to a destination. In case where the destination is, for example, a printing engine or station 14, the four-color data Bk, C, M and Y are transferred thereto in this order.

On the other hand, lowest-order three bits of each address outputs of the primary scanning direction counter 2 and the subordinate scanning direction counter 3 are connected to a storage device 8 for storing a dither threshold matrix. The storage device 8 outputs a threshold which is uniquely determined by space coordinates of the image.

Each address used for accessing this storage device 8 is 6 bits in length. Thus 64 pieces of threshold data stored in the storage device 8 can be accessed. In this case, for instance, a matrix composed of 8×8 matrix elements as illustrated in FIG. 25 is employed as a dither threshold matrix to be stored in the storage device 8.

Then, the threshold outputted from the storage device 8 is inputted to a comparator 9 whereupon the inputted threshold Is compared with lowest-order six bits of the density data, which is composed of 8 bits and represented by a density level signal 10 outputted from a data selector 7. If a value represented by the lowest-order six bits of the density data is greater than ib the threshold, the comparator 9 outputs, for example, 1 as a result 11 of the comparison. If the value represented by the lowest-order six bits of the density data is less than the threshold, the comparator 9 outputs, for instance, 0 as the result 11 of the comparison.

On the other hand, highest-order two bits of the density data outputted from the data selector 7 is connected to another storage device 12 for re-determining a value of the densities of the pixels. Then, the storage device 12 is accessed by using data represented by three bits (namely, the two bits inputted from the data selector 7 to the storage device 12 and one bit representing the result 11 of the comparison outputted from the comparator 9). Thus a final output value 13 is outputted from the storage device 12.

In FIG. 12, examples of the final output values 13 in case of employing the multi-level dithering method are shown. As above described, the highest-order two bits of the output of the data selector 7 are represented by the density level signal 10 and the result 11 of the comparison is output data of the comparator 9.

The above described configuration is employed for implementing hardware to be used for performing the multi-level dithering method. As shown in FIG. 26, the final output values are 0, 3F, 7F, BF and FF and thus the number of the levels is 5. Namely, the dithering method performed in this case is 5-level dithering method.

Generally, in case where a full-color image is outputted by an image output equipment using a small number of levels for printing an output image, the multi-level dithering method is widely employed. Even if the number of levels available in an image output equipment itself is 4, the number of pseud-tone levels obtained by employing a dither threshold matrix having a relatively large number of matrix elements, for example, 8×8 can be 193 as follows.

$$8 \times 8 \times (4-1) + 1 = 193 \tag{1}$$

As explained above, pseudo-tone reproduction techniques are widely used in image output equipments such as conventional LBPs and thermal transfer printers, in which only a small number of levels resulted from an electrophotography process or a transfer principle employed therein are available for printing an output image.

For instance, a dither threshold matrix of a halftone dot type (namely, a threshold matrix in which a plurality of concentrated dots are generated for the purpose of forming a balance of improvements in resolution and tone reproducibility) is devised and employed in such an image output equipment. Further, the resolution of the image output equipment is improved by decreasing the minimum size of recording-dots. Moreover, the dither matrix is irregularly changed according to density levels. Thereby, picture quality can be improved to a certain extent.

However, when the number of tone levels needs to be increased even in case of performing a multi-level dithering method, resolution is inevitably degraded. Further, as the result of employing a principle of using intermediate tone levels in a pixel, unevenness of density is liable to occur in a recorded image.

Moreover, in spite of the fact that the lower densities of pixels of a portion of an output image are, the smoother change in densities among the pixels of the portion is required from the view point of visual characteristics, only several discrete density levels are used in the image output equipment. This gives rise to coarse subpatterns or a texture when a portion composed of recording-pixels of the lowest density are formed as a white ground. Thus picture quality is degraded, especially in the portion composed of pixels of low densities.

Furthermore, suppression of occurrence of what is called a "crush" (namely, a phenomenon that a dot and four-neighboring dots thereof are completely fused together with growth of each of the pixels after thermal fixing) can be achieved consistently with reproduction of a solid portion of high densities positively utilizing a "crush". Namely, in case where the tone levels and the dither matrix are established in such a manner to completely suppress occurrence of a "crush", the tone reproducibility is surely improved in the portion of high densities, whereas absolute density levels of pixels are apt to be low to an extent insufficient for preferably printing an output image throughout an output image. In contrast, if occurrence of a "crush" is permitted, the absolute density levels of pixels to a certain extent can be assured, whereas the tone reproducibility is degraded in the portion of high densities.

Additionally, in case where another dither matrix, which describes a rule other than a normal rule for preventing occurrence of a "crush", is provided, it is essentially difficult to prevent degradation of character quality treated as a line drawing or image and there is a limit to improvement of picture quality.

The present invention is created to eliminate the above described drawbacks of the conventional devices.

SUMMARY OF THE INVENTION

It is, therefore, an object of the present invention to provided an image forming device which can prevent degradation of resolution and occurrence of a moire fringe and a texture and can obtain a high-quality record image excelling in tone reproducibility in all density ranges.

To achieve the forgoing object, in accordance with the present invention, there is provided an image forming device which forms an image comprising a plurality of dots from input image data comprising a plurality of pixels, each of which has an image density. A block partitioning means partitions the input image data into blocks, each of the blocks having a predetermined number of pixels and each of the pixels having a predetermined position within each of the blocks. A tone modulation processor determines priorities corresponding to predetermined positions of the pixels within each of the blocks. The tone modulation processor changes the size of the dots according to the image densities of the pixels within the block by increasing the size of the dots corresponding to the pixels in such a manner that the size of one of the dots corresponding to one of the pixels is larger than that of another one of the dots corresponding to another one of the pixels having a lower priority but having the same image density.

Thereby, degradation of resolution as well as occurrence of a moire fringe and a texture can be prevented. Thus high-quality tone reproduction of an input image can be achieved.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 5 is a diagram for illustrating the contents of a tone transformation table of FIG. 2;

FIGS. 7(a) through 7(d) are graphs for showing a second tone transformation characteristic I in the embodiment of FIG. 1;

FIG. 14 is a diagram for illustrating the contents of another tone transformation characteristic;

FIG. 24 is a graph for showing a density transformation characteristic employed in a density transformation portion of FIG. 23;

FIG. 25 is a diagram for illustrating an example of a conventional dither threshold matrix consisting of 8×8 elements; and FIG. 26 is a diagram for illustrating examples of output values of the conventional image processor of FIG. 23 employing the multi-level dithering method.

DETAILED DESCRIPTION OF THE PREFERRED EMBODIMENTS

Hereinafter, preferred embodiments of the present invention will be described in detail by referring to the accompanying drawings.

Figure 1:
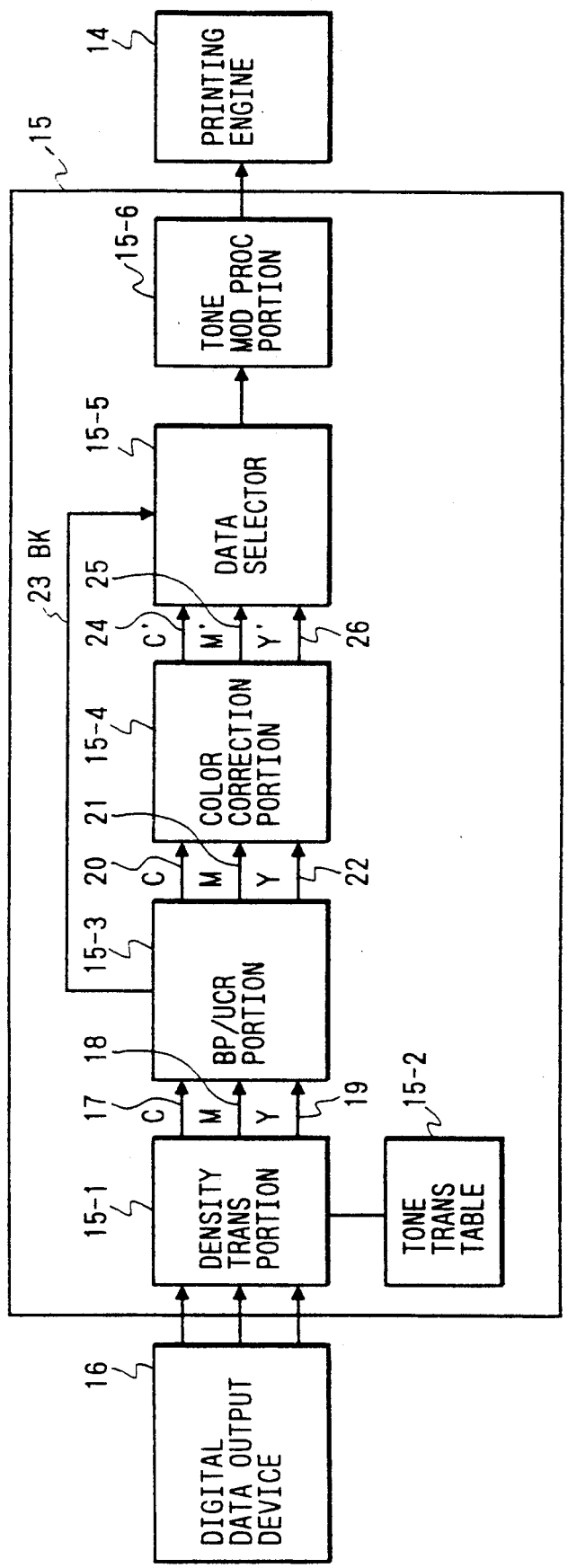
FIG. 1 is a schematic block diagram for showing the construction of an image forming device embodying the present invention.

FIG. 1 is a schematic block diagram for showing the construction of an Image forming device embodying the present invention. In this figure, reference numeral 15 designates an image processor which comprises a density transformation portion 15-1, a transformation table storing portion 15-2, a black-printing/UCR processing portion 15-3, a color correction portion 15-4, a data selector 15-5 and a tone modulation processing portion 15-6. Further, the image processor 15 is connected to a digital data output device 16 at the side of input terminals thereof and to a printing engine or station 14 at the side of an output terminal thereof.

An image signal outputted from an image scanner (not shown), a video camera (also not shown) or the like is inputted to the digital data output device 16. Further, the digital data output device 16 may then perform an analog-to-digital (A/D) conversion and predetermined image processing on image data represented by the input image signal. The image data may be preliminarily stored in a memory before the A/D conversion and predetermined image processing. Moreover, the digital data output device 16 may be an interface to a communication means for directly inputting the image signal therefrom.

Next, an operation of the image processor 15 will be described hereinbelow by referring to FIGS. 2 to 8.

First, when the printing engine 14 is activated, the digital data output device starts transferring digital image data to the image processor 15. The image data to be processed is 24 bits in length and is comprised of three pieces of 8-bit component data (hereunder sometimes referred to simply as RGB data) respectively corresponding to colors R, G and B. The RGB data inputted to the image processor 15 are luminance data and are converted by the density transformation portion 15-1 into density data respectively corresponding to subtractive primary colors C (cyan), M (magenta) and Y (yellow).

Generally, this transformation can be easily achieved by preliminarily writing transformation table data to a storage device such as a RAM, a ROM or the like composing the transformation table storing portion 15-2, then suitably offsetting the input data and thereafter accessing the transformation table data. Usually, the density transformation portion 15-1 can control monochromatic density data, total density data, contrast data and under-color data of an input image.

The RGB data (or luminance data) are converted into the density data (hereunder referred to simply as CMY data) 17, 18 and 19. Then, the UCR processing as well as the generation of a black printing is performed in the black-printing/UCR processing portion 15-3 by using the CMY data. By performing the UCR processing, each piece of the CMY data 17, 18 and 19 is reduced at a regular rate with respect to a common quantity of the CMY data. Basically, black printing data, of which the quantity is equal to the reduced quantity of the CMY data, is generated. An original object of the black-printing/UCR processing is to save toner by replacing the common quantity of the CMY data corresponding to each pixel with the black-printing data.

However, there is hardly any case where the black-printing/UCR processing is performed only for saving the toner. For example, the black-printing/UCR processing is further intended for preventing degradation of the tone reproducibility in the portion of high densities of an output image and for securing the contrast and gray-level balance in the portion of high densities. A higher-quality output image can be realized by positively changing the quantities of the CMY data and the black-printing data when performing the black-printing/UCR processing. Thus C-data 20 corresponding to cyan, M-data 21 corresponding to magenta, Y-data 22 corresponding to yellow and Bk-data 23 corresponding to black have been produced when completing the black-printing/UCR processing.

Thereafter, the C-data 20, the M-data 21 and the Y-data 22 other than the Bk-data 23 which is neutral color (namely, achromatic color) component data are inputted to the color correction portion 15-4. In the color correction portion 15-4, processings such as a masking processing is performed on chromatic color component data (namely, the C-data 20, the M-data 21 and the Y-data 22). An object of this masking processing is to compensate influence of unnecessary absorption bands of each color toner.

For instance, a cyan toner (hereunder referred to as C-toner) has unnecessary absorption bands in wavelength regions other than a wavelength region corresponding to cyan. Practically, the cyan toner has, for example, a yellow color component (hereunder abbreviated as Y-color-component). Similarly, a magenta toner (hereunder referred to as M-toner) has Y-color-component. Therefore, when recording yellow parts of an image, it is necessary to reduce Y-color-components included in C-toner and M-toner according to density levels of cyan and magenta to be recorded. For that purpose, the following process is usually performed. First, a 3×3 matrix operation is performed on C-data, M-data and Y-data represented by digital signals. Further, the result of this operation is preliminarily written to the storage device such as a ROM. The thus written result is added to or subtracted from C-data, M-data and Y-data after the C-data, the M-data and the Y-data are accessed.

Previously, a linear masking processing employing a 3×3 matrix was mainly used. This linear masking processing, however, is not effective. Thus various non-linear masking processing of higher than second degree has recently come to be in use. Additionally, there have been employed many kinds of other color correction methods which treat the color correction itself as a mapping and find a mapping function in a mapping space other than CMY space.

Subsequently, the color correction portion 15-4 transforms the C-data 20, the M-data 21 and the Y-data 22 inputted thereto into C'-data 24, M'-data 25 and Y'-data 26, respectively. Incidentally, the Bk-data 23 corresponds to achromatic color and thus is not concerned with the color correction.

Thereafter, data corresponding to one kind of color is selected by the data selector 15-5 from the chromatic color data (namely, the C'-data 24, M'-data 25 and Y'-data 26 obtained as the result of the color correction effected by the color correction portion 15-4) and the achromatic color data (namely, the Bk-data 23). The selected data is then inputted to the tone modulation processing portion 15-6 whereupon a tone modulation processing according to the present invention is performed on image signals. Subsequently, output image signals 37 representing the result of the tone modulation processing (see FIG. 2) are sent to the printing engine 14. Thus a high-quality record image at which the present invention aims is obtained.

Figure 2:
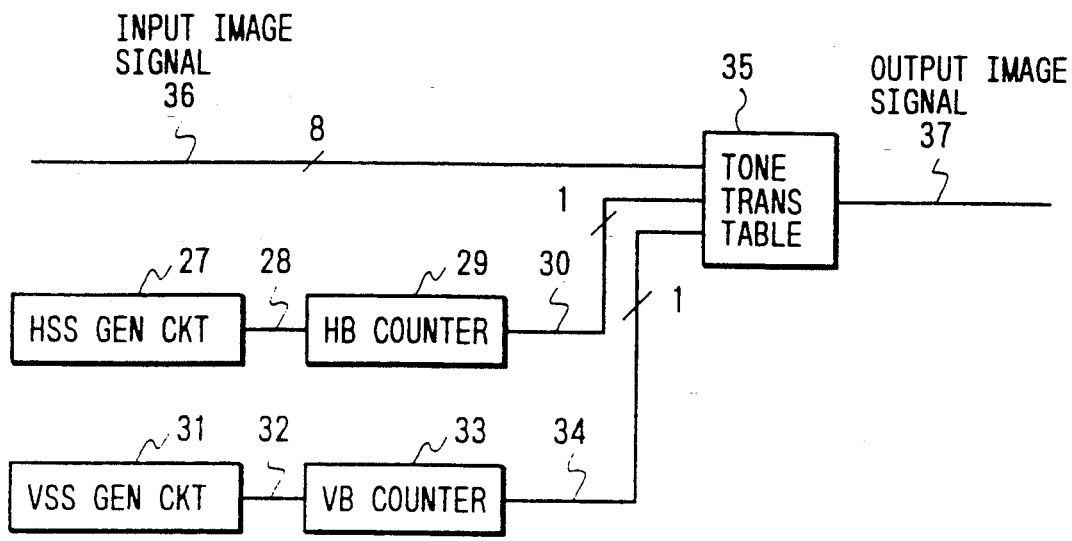
FIG. 2 is a schematic block diagram for showing the construction of a tone modulation processing portion of FIG. 1.

Hereinafter, the tone modulation processing according to the present invention will be described in detail by referring to FIG. 2 which is a schematic block diagram for showing the construction of the tone modulation processing portion 15-6 of FIG. 1. In this figure, reference numeral 27 designates a horizontal synchronization signal generating circuit which outputs a horizontal synchronization signal 28. For instance, in case of a laser beam printer, a beam detection signal from a laser scanning optical system can be employed as the horizontal synchronization signal by shaping the waveform thereof. Further, reference numeral 29 denotes a horizontal binary counter which counts the horizontal synchronization signals 28. Every time when the horizontal synchronization signal 28 is inputted thereto, the state of an output 30 of the horizontal binary counter 29 is changed between an on-state and an off-state.

Reference numeral 31 represents a vertical synchronization signal generating circuit which outputs a vertical synchronization signal 32. For example, a data transfer clock signal can be employed as the vertical synchronization signal. Further, reference numeral 33 represents a vertical binary counter which counts the vertical synchronization signals 32. Each time when the vertical synchronization signal 32 is inputted thereto, the state of an output 34 of the vertical binary counter 33 is changed between an on-state and an off-state.

Figure 3:
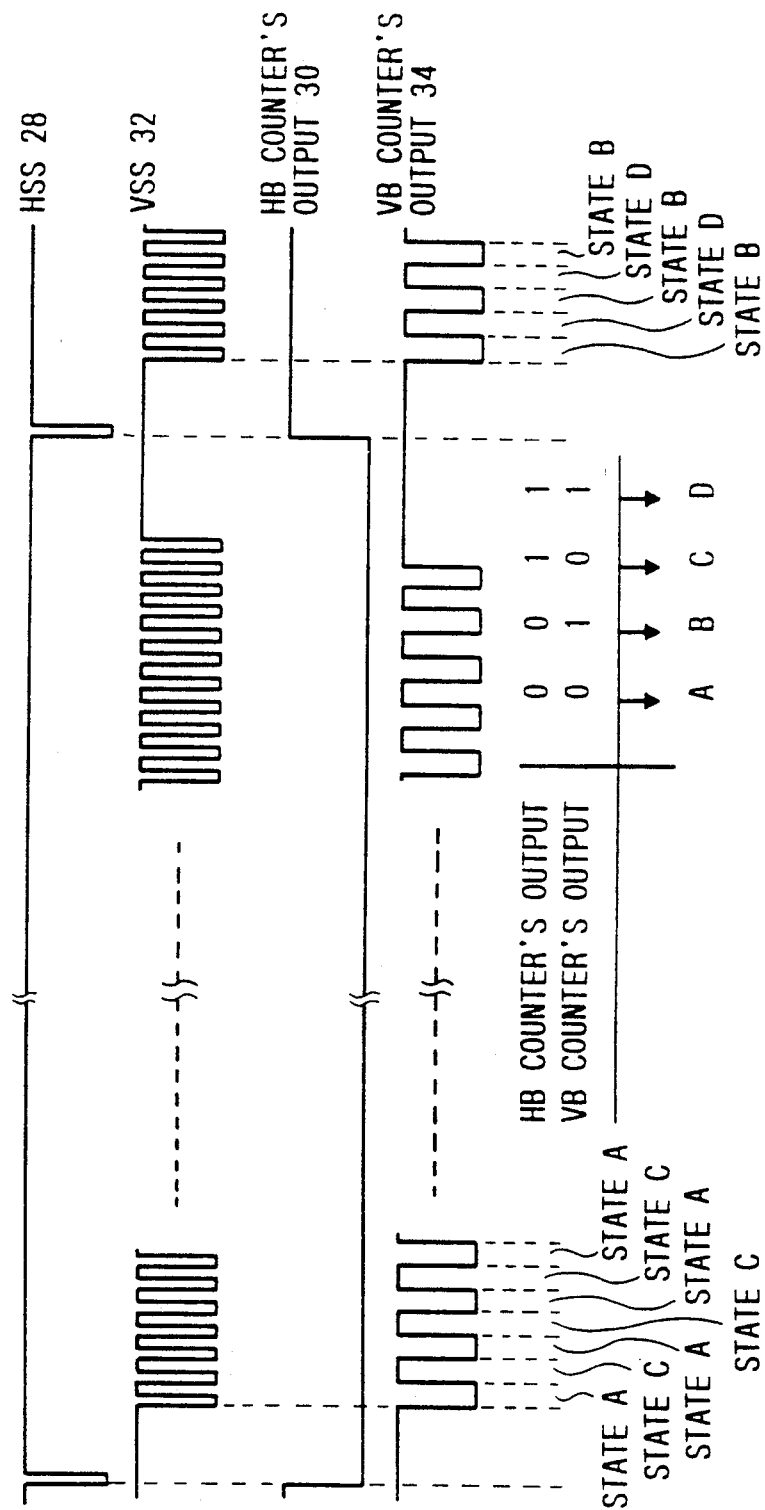
FIG. 3 is a waveform chart for illustrating an operation of each circuit of FIG. 2 and outputs of counters of FIG. 2.
Figure 6A:
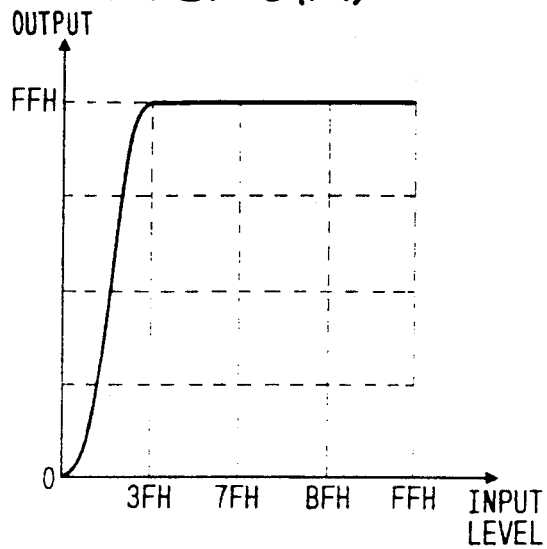
FIGS. 6(a) through 6(d) are graphs for showing a first tone transformation characteristic in the embodiment of FIG. 1.
Figure 6C:
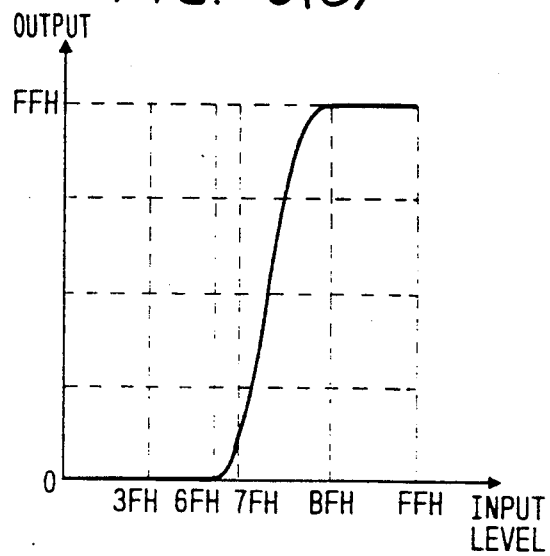
Figure 6B:
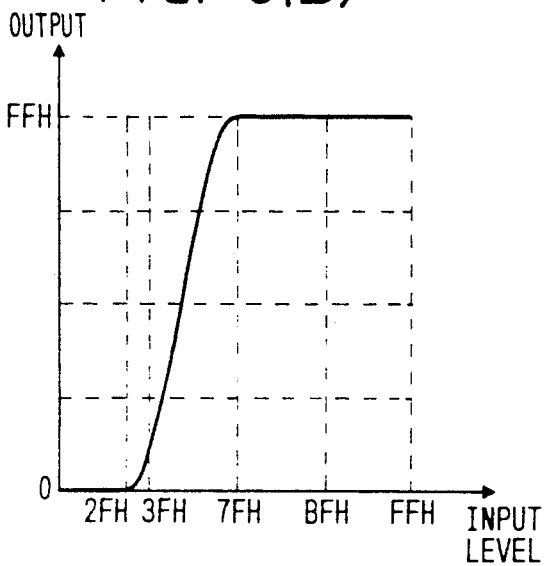
Figure 6D:
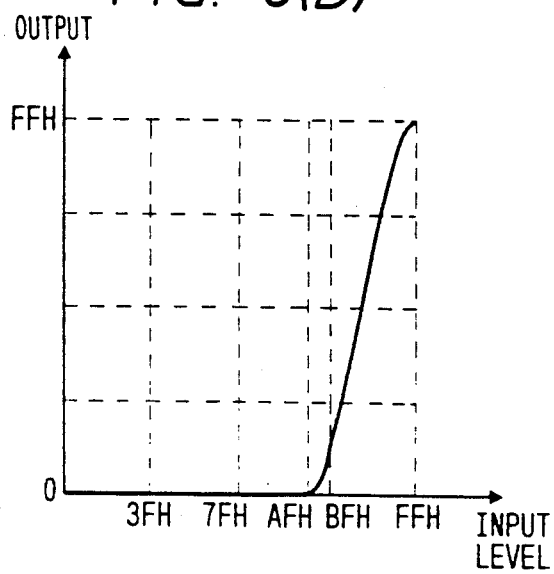
Figure 8A:
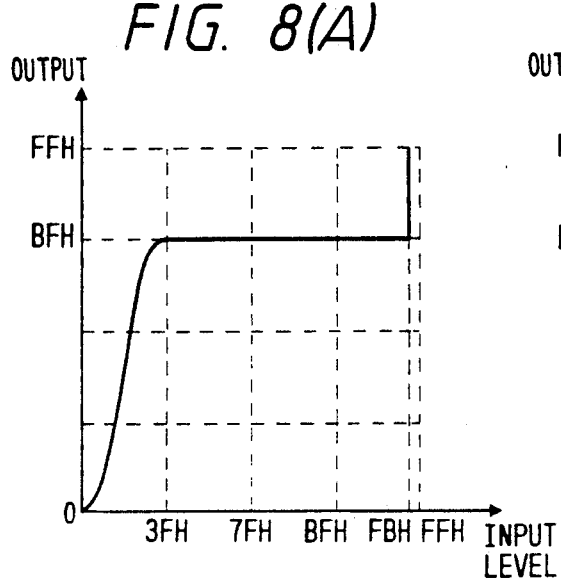
FIGS. 8(a) through 8(d) are graphs for showing a second tone transformation characteristic II in the embodiment of FIG. 1.
Figure 8C:
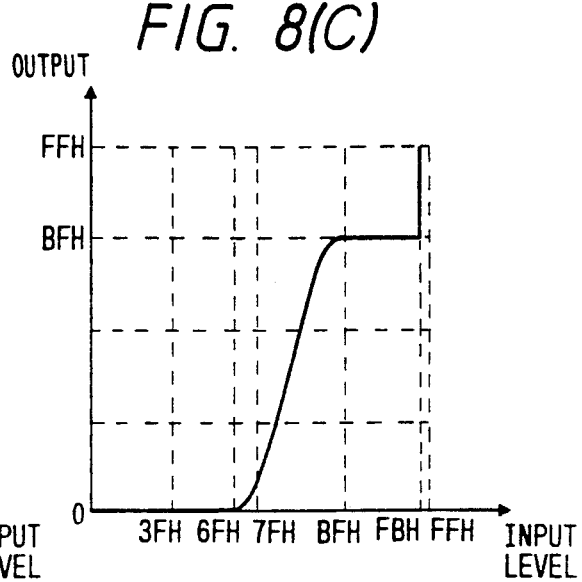
Figure 8B:
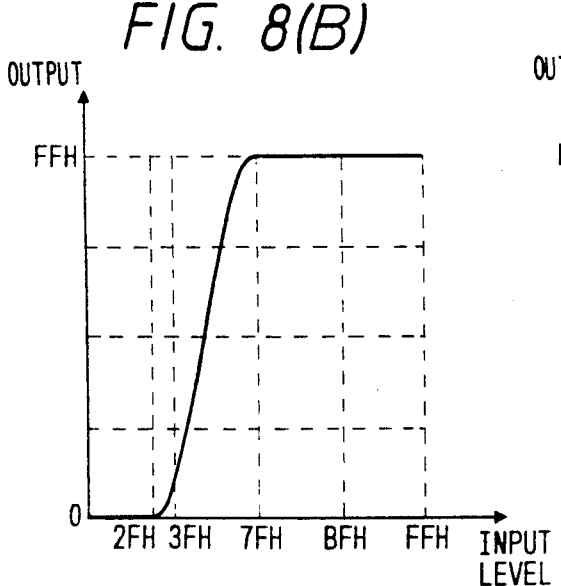
Figure 8D:
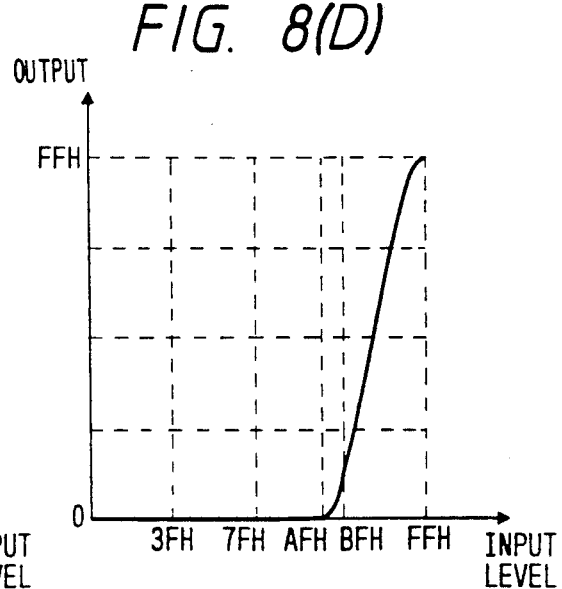

To further detailedly describe each of these signals, it is shown in FIG. 3 how the vertical synchronization signal 28, the vertical synchronization signal 32, the output 30 of the horizontal binary counter 29 and the output 34 of the vertical binary counter 33 vary with time. Namely, the horizontal synchronization signal 28 is generated once every transfer of data of one line (i.e., every "line period") in synchronization with the head or leading bit of the data of one line. In contrast, the vertical synchronization signal 32 is generated correspondingly to each piece of data of one line (namely, every "pixel period"). Therefore, the numbers of times of generating the vertical synchronization signals in a period corresponding to one line is equal to the number of pixels of one line. In case where these signals 28 and 32 are counted by the binary counters 29 and 33, respectively, there are four kinds of combinations of the state of the output 30 of the binary counter 29 and that of the output 34 of the binary counter 33.

Figure 4:
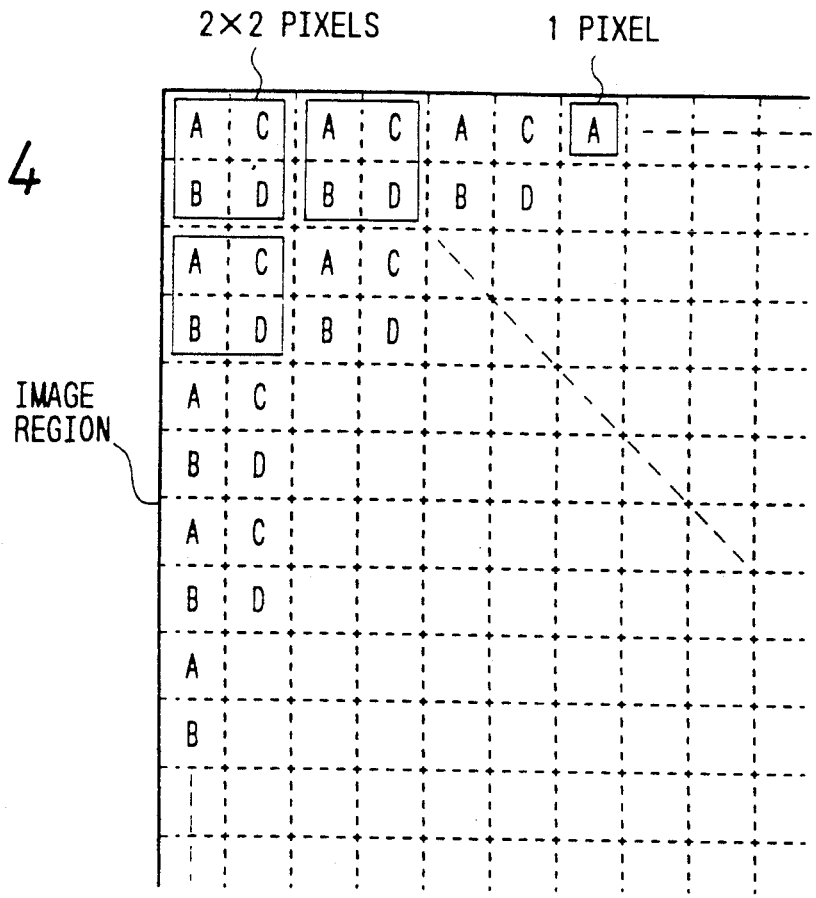
FIG. 4 is a diagram for illustrating states of outputs of the counters of FIG. 2 corresponding to each pixel.

As illustrated in FIG. 3, let a state A indicate a state in which the output of the horizontal binary counter=0 and the output of the vertical binary counter=0; a state B a state in which the output of the horizontal binary counter=1 and the output of the vertical binary counter=0; a state C a state in which the output of the horizontal binary counter=0 and the output of the vertical binary counter=1; and a state D a state in which the output of the horizontal binary counter=1 and the output of the vertical binary counter=1. One of these states A, B, C and D uniquely corresponds to the position of each pixel. Thus the states of the combination of the outputs of the binary counters corresponding to pixels are classified into states A, B, C and D as illustrated in FIG. 4 by way of example.

Hereinafter, let positions A, B, C and D denote the positions of pixels regularly arranged in a space corresponding to the states A, B, C and D, respectively. Then, the whole image of FIG. 4 can be partitioned into regions each consisting of 2×2 pixels of the positions A, B, C and D as illustrated therein.

Turning back to FIG. 2, reference numeral 35 indicates a tone transformation table storing device for storing a tone transformation table which includes transformed density levels of pixels to be accessed by using data (hereunder referred to as address line data) represented by an input image signal 36, the output 30 of the horizontal binary counter 29 and the output 34 of the vertical binary counter 33 as data indicating memory addresses. The address line data is 10 bits in length. The lowest-order 8 bits of the address line data are assigned to the data represented by the input image signal 36. (In other words, the data represented by the input image signal 36 is stored as the lowest-order 8 bits of the address line data.) Further, the 9th bit from the lowest significant bit (LSB) thereof is assigned to the output 34 of the vertical binary counter 33. Moreover, the 10th bit (i.e., the most significant bit (MSB)) thereof is assigned to the output 30 of the horizontal binary counter 29.

Hereinafter, the tone transformation table stored in the device 35 will be described by referring to FIGS. 5 and 6. First, a first example of the tone transformation table employing a first tone transformation characteristic will be described hereinbelow. FIG. 5 shows the contents of the first example of the tone transformation table. In case where the data represented by the input image signal is 8 bits in length and thus can represent 256 tone levels, 256 addresses or locations of the table are required for indicating the tone transformation characteristic corresponding to a pixel. In this example, a priority is determined correspondingly to each of pixels composing a block. Further, each pixel of a block has one of four tone transformation characteristics respectively corresponding to the positions A, B, C and D. Thus total 1024 addresses are required for indicating the tone transformation characteristics respectively corresponding to four pixels of each block.

Namely, as shown in FIG. 5, the data indicating the tone characteristic corresponding to the position A is stored at addresses 000H–0FFH. Further, the data indicating the tone characteristic corresponding to the position C is stored at addresses 100H–1FFH. Moreover, the data indicating the tone characteristic corresponding to the position B is stored at addresses 200H–2FFH. Furthermore, the data indicating the tone characteristic corresponding to the position D is stored at addresses 300H–3FFH.

FIG. 6 is a graph for showing the first tone transformation characteristic in this example. In this graph, the horizontal axis represents the tone levels of the pixels of the input image and the vertical axis represents output levels obtained as the result of the transformation. In this example, the priority of the position A corresponding to FIG. 6(1) is set to be higher than those of the positions B, C and D. Further, the position B corresponding to FIG. 6(2) has the second highest priority and the position C corresponding to FIG. 6(3) has the third highest priority. Moreover, the priority of the position D corresponding to FIG. 6(4) is set to be lower than those of the positions A, B and C.

In case of the tone characteristic corresponding to the position A, namely, corresponding to the pixel having the highest priority, the output continuously increases while the tone level of this pixel of the input image varies from 00H to 3FH, but the output is fixedly set to be FFH when the tone level of this pixel exceeds 3FH.

Further, in case of the tone characteristic corresponding to the position B, namely, corresponding to the pixel having the second highest priority, the output is 00H when the tone level of this pixel is less than 2FH, and then the output continuously increases while the tone level of this pixel of the input image varies from 2FH to 7FH, but the output is fixedly set to be FFH when the tone level of this pixel exceeds 7FH.

Moreover, in case of the tone characteristic corresponding to the position C, namely, corresponding to the pixel having the third highest priority, the output is 00H when the tone level of this pixel is less than 6FH, and then the output continuously increases while the tone level of this pixel of the input image varies from 6FH to BFH, but the output is fixedly set to be FFH when the tone level of this pixel exceeds BFH.

Furthermore, in case of the tone characteristic corresponding to the position D, namely, corresponding to the pixel having the lowest priority, the output is 00H when the tone level of this pixel is less than AFH, and then the output continuously increases while the tone level of this pixel of the input image varies from BFH to FFH, and the output finally reaches FFH.

In this way, in this embodiment, priorities are respectively assigned to pixels of an image block extracted from an input image and then the pixels to which a priority is assigned is made to "grow" (or become larger). Moreover, before the pixels of a priority completes their growth, the pixels of the next priority start growing. In other words, the tone transformation characteristic of the tone transformation table stored in the device 35 is set in such a manner that even when a pixel having a priority is growing, another pixel having the next priority starts growing.

Next, a second tone transformation characteristic I of FIG. 7 and another second tone transformation characteristic II of FIG. 8 which are different from the first tone transformation characteristic of FIG. 6 will be described hereinbelow.

Similarly as in case of the first tone transformation characteristic of FIG. 6, the tone transformation characteristics of FIGS. 7 and 8 are set in such a manner that a dot corresponding to a pixel having a lower priority starts growing while another dot corresponding to another pixel having a higher priority is growing.

FIG. 7 is a graph for showing the second tone transformation characteristic I. The second tone transformation characteristic I of this figure suppresses the growth of dots corresponding to, for instance, the positions A and C having the specific priorities. In principle, a dot corresponding to a lower priority starts growing before the growth of another dot corresponding to a higher priority enters a pseudo or intrinsic saturation region. Therefore, in a border between positions having different tone transformation characteristics, the tone reproducibility can be preferably corrected. In contrast, in a range of high tone levels, occurrence of what is called a "crush" (namely, the phenomenon that a dot and four-neighboring dots thereof are completely fused together with growth of each of the pixels in the range of high tone levels after thermal fixing) can effectively be suppressed and the tone reproducibility can be improved.

FIG. 8 is a graph for showing the second tone transformation characteristic II. The second tone transformation characteristic II of this figure is established in such a fashion that dots corresponding to, for instance, the positions A and C having the specific priorities are made to continuously grow up to a certain tone level and thereafter the growth of these dots are made to falsely be saturated and the dots are recorded at the maximum output level when the tone level of the pixel of the input image is very high. In principle, a dot corresponding to a lower priority starts growing before the growth of another dot corresponding to a higher priority enters a pseudo or intrinsic saturation region. Therefore, in a border between positions having different tone transformation characteristics, the tone reproducibility can be preferably corrected.

On the other hand, a process of constraining the growth of a pixel having a high priority can effectively suppress occurrence of a "crush" and can improve the tone reproducibility. Further, a process of recording or printing a dot at the highest output density level when the tone level of the pixel having a high priority of the input image is very high is performed only when tone reproduction using a very high tone level is necessary for printing a solid region having very high tone levels. Thereby, in a border portion between pixels having different priorities, the tone reproducibility of an output image can be improved. Moreover, suppression of occurrence of what is called a "crush" can be achieved consistently with reproduction of a solid region of high densities positively utilizing a "crush".

In the foregoing description, this embodiment has been described in detail by using blocks each having 2×2 pixels. This embodiment, however, can be applied to any other cases where a block of another size is employed. Further, the relation between the priorities and the positions of pixels of each block and the number of pixels corresponding to dots which are preferentially made to grow can be easily altered. Such alteration can be realized only by changing the number of bits counted by the counters according to according to the size of the block (incidentally, the size in a direction of the block may be different from that in another direction thereof) and securing a tone-transformation-table storing area of the number of output states of the counters and modifying the contents of each of the tone transformation tables.

Next, another embodiment of the present invention will be described by referring to FIGS. 9 to 13. Incidentally, this embodiment is an image forming device in case where a block is composed of two pixels and priorities are respectively assigned to two pixels of each block.

Figures 9, 10:
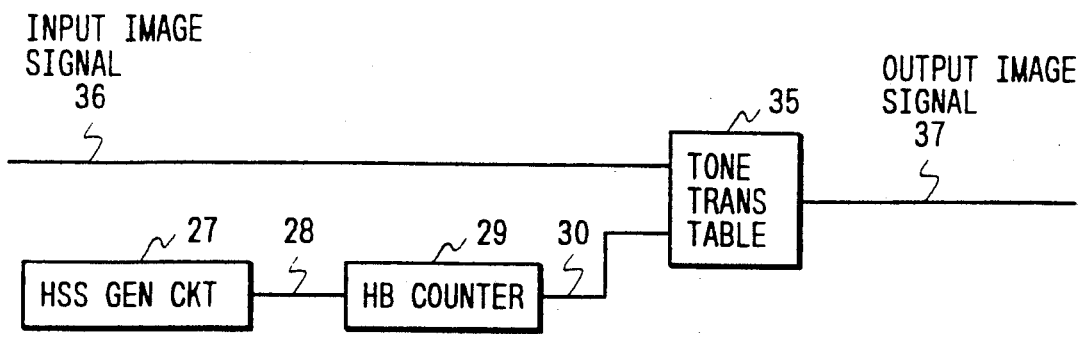
FIG. 9 is a schematic block diagram for showing the construction of a tone modulation processing portion of another embodiment of the present invention.
FIG. 10 is a diagram for illustrating the contents of a tone transformation table of FIG. 9.

FIG. 9 is a schematic block diagram for showing the construction of the tone modulation processing portion 15-6 of FIG. 1. The tone modulation processing portion 15-6 of this embodiment is comprised of a horizontal synchronization signal generating circuit 27, a horizontal binary counter 29 and a tone transformation table storing device 35 and thus is constructed by removing the vertical synchronization signal generating circuit 31 and the vertical binary counter 33 from the configuration of FIG. 2.

The horizontal binary counter 29 counts the horizontal synchronization signals 28. Every time the horizontal synchronization signal is inputted thereto, the state of an output 30 of the horizontal binary counter 29 is changed between an on-state and an off-state. Thereby, it is detected which of an even line corresponding to the off-state and an odd line corresponding to the on-state. Further, the tone transformation table storing device 35 stores a tone transformation table which includes transformed density levels of pixels to be accessed by using data represented by an input image signal 36 and the output 30 of the horizontal binary counter 29 as data indicating memory addresses.

Hereinafter, the tone transformation table stored in the device 35 of this embodiment will be described by referring to FIGS. 10 and 11. FIG. 10 shows the contents of the tone transformation table of this embodiment. In case where the data represented by the input image signal is 8 bits in length and thus can represent 256 tone levels, 256 addresses or locations of the table are required for indicating the tone transformation characteristic corresponding to a pixel. This embodiment employs two tone transformation characteristics respectively corresponding to each even line and each odd line. Thus total 512 addresses are required for indicating the two tone transformation characteristics.

Namely, as shown in FIG. 5, the data indicating the tone characteristic corresponding to each even line is stored at addresses 00H-FFH. Further, the data indicating the tone characteristic corresponding to each odd line is stored at addresses 100H-1FFH.

Figure 11:
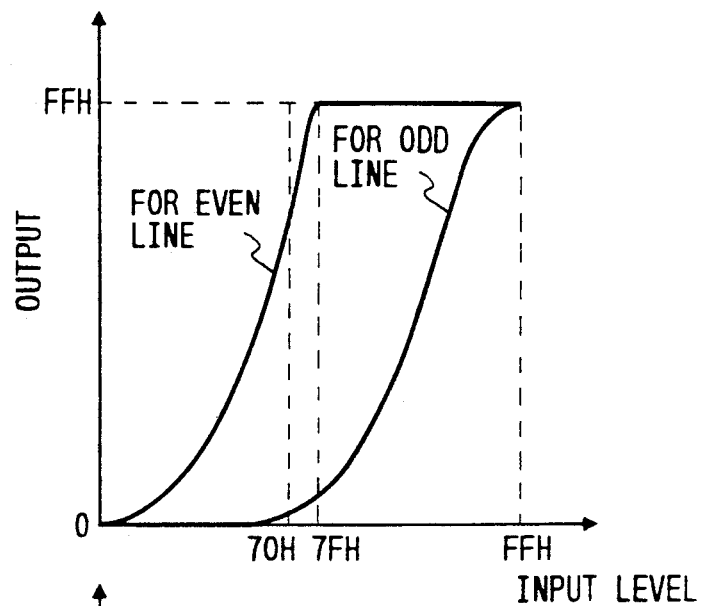
FIG. 11 is a graph for showing a third tone transformation characteristic in the embodiment of FIG. 9.

FIG. 11 is a graph for showing a third tone transformation characteristic in this embodiment. In case of the tone characteristic corresponding to each even line, namely, corresponding to the even line having a higher priority, the output continuously increases until the tone level of the pixel of this line of the input image reaches, for example, 7FH, and the output is fixedly set to be FFH when the tone level exceeds 7FH.

In contrast, in case of the tone characteristic corresponding to the odd line having the lowest priority, the output is fixedly set to be 00H when the tone level of this pixel is less than 70H, and then the output simply increases as the tone level of the pixel of this line rises, and the output finally reaches the maximum value FFH.

Figure 12:
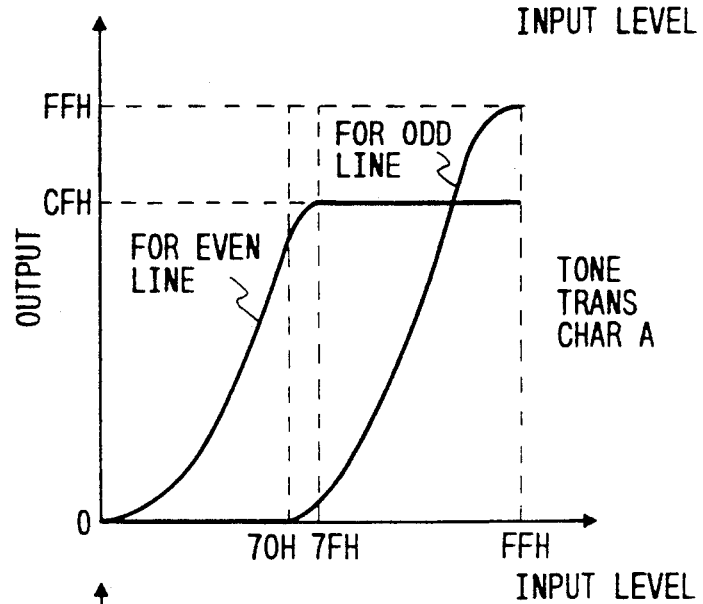
FIG. 12 is a graph for showing a fourth tone transformation characteristic A in the embodiment of FIG. 9.
Figure 13:
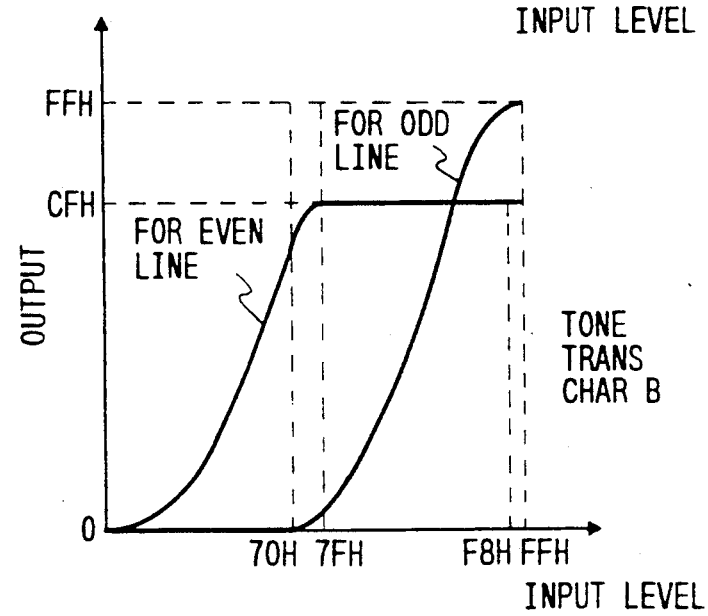
FIG. 13 is a graph for showing another fourth tone transformation characteristic B in the embodiment of FIG. 9.
Figure 15A:
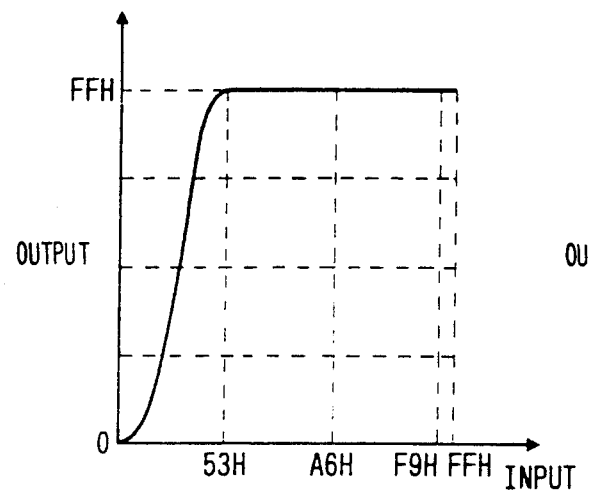
FIGS. 15(a) through 15(d) are graphs for showing a fifth tone transformation characteristic.
Figure 15C:
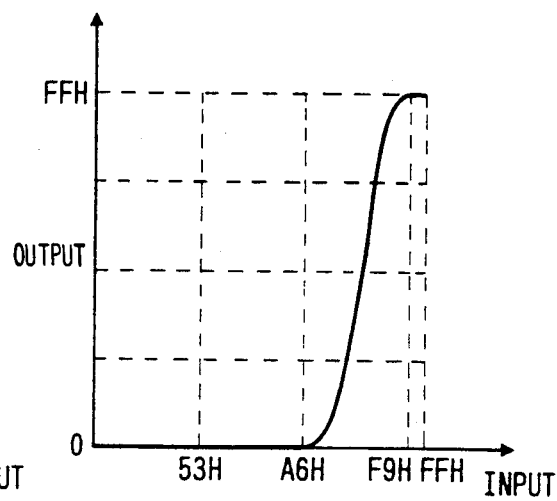
Figure 15B:
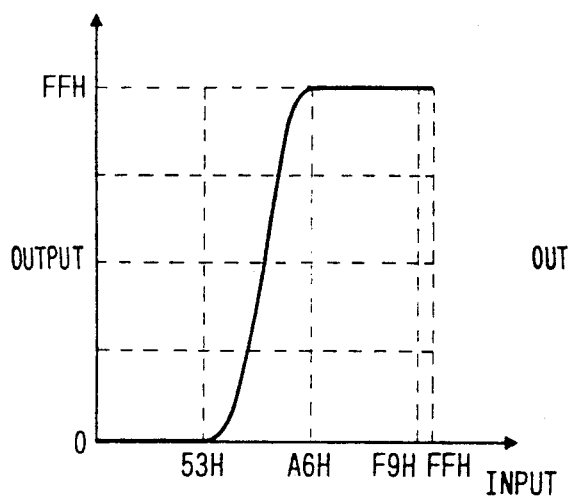
Figure 15D:
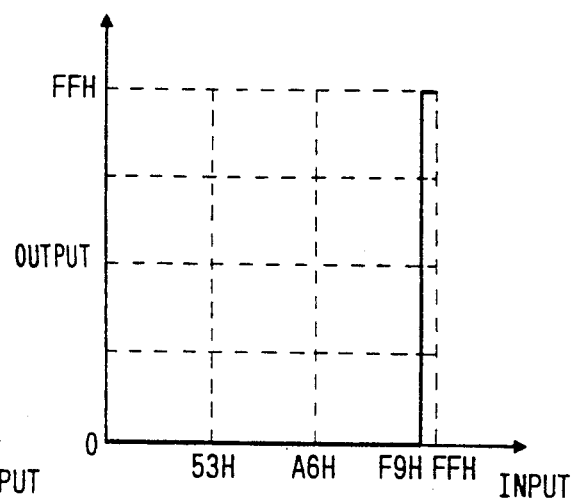
Figure 16A:
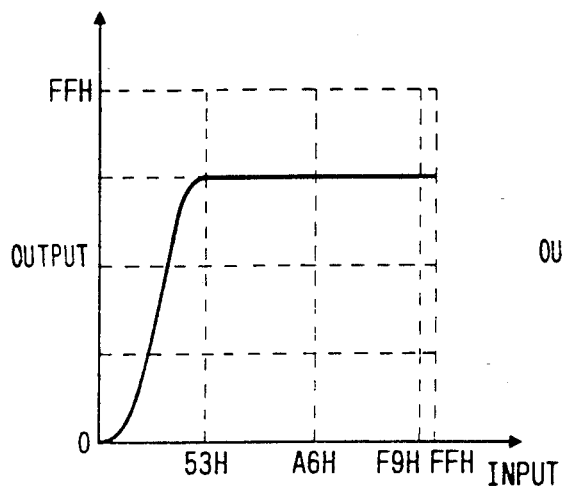
FIGS. 16(a) through 16(d) are graphs for showing a sixth tone transformation characteristic I.
Figure 16C:
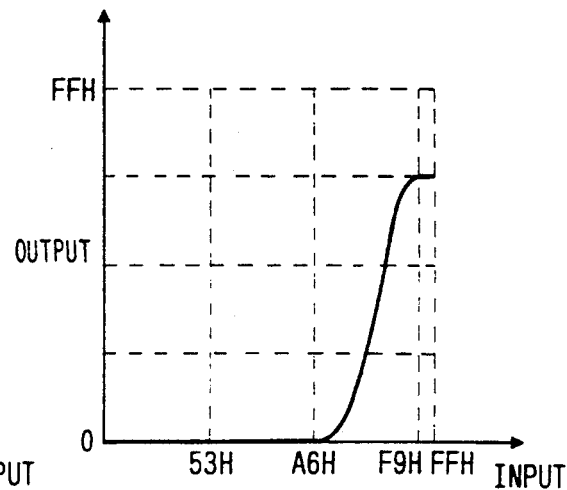
Figure 16B:
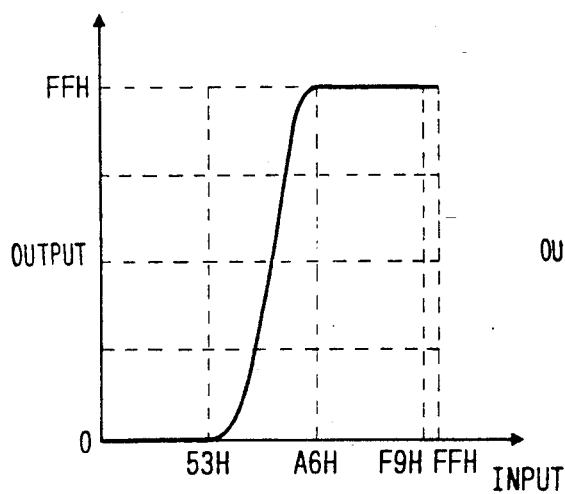
Figure 16D:
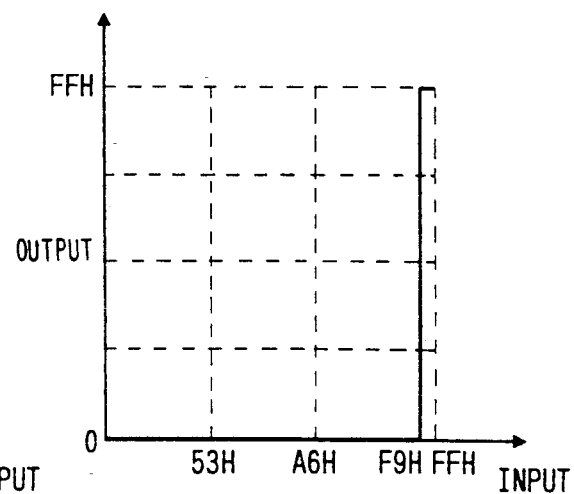
Figure 17A:
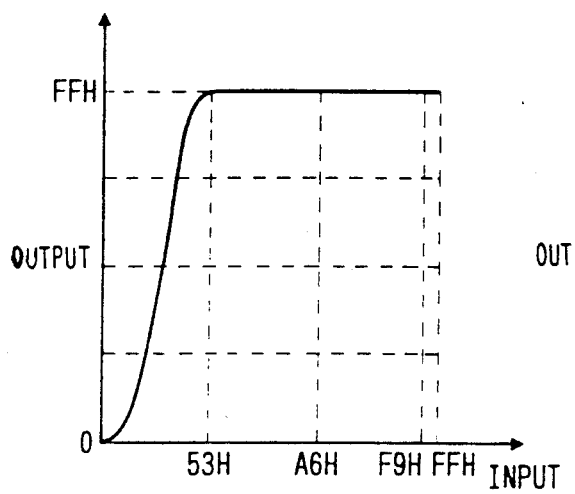
FIGS. 17(a) through 17(d) are graphs for showing another sixth tone transformation characteristic II.
Figure 17C:
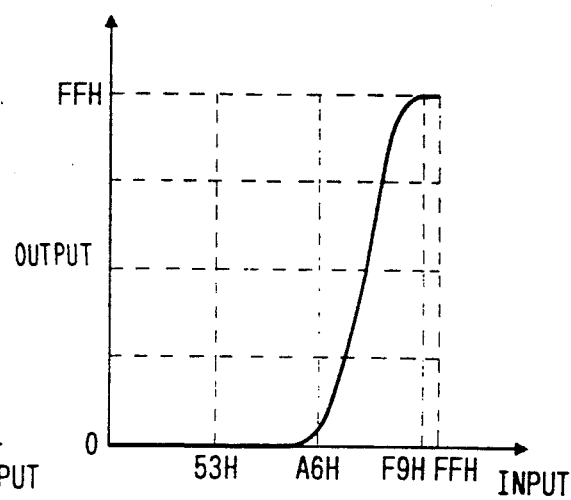
Figure 17B:
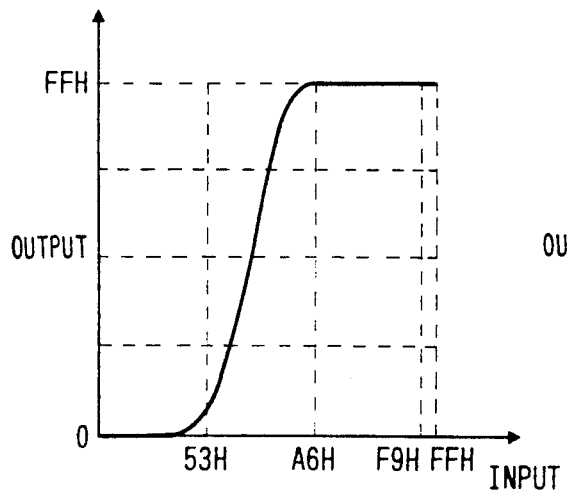
Figure 17D:
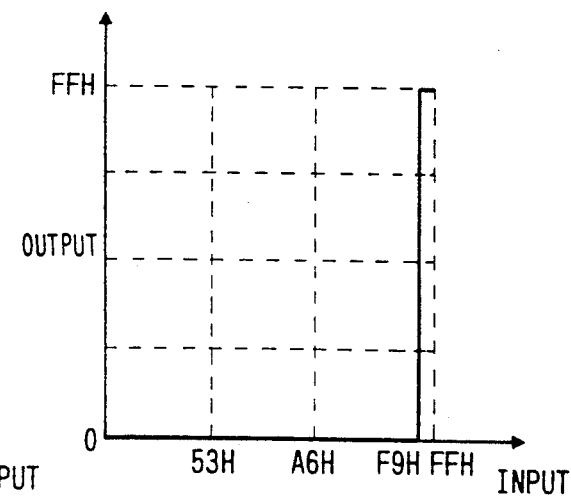
Figure 18A:
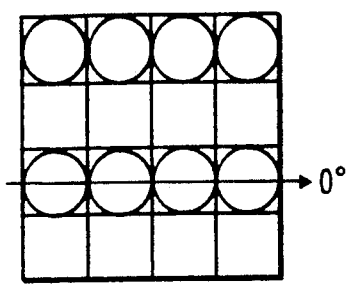
FIGS. 18(a) through 18(d) are diagrams for illustrating arrangements of pixels, which are made to grow earlier in a block, corresponding to recording colors.
Figure 18B:
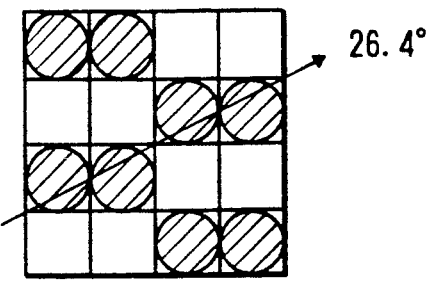
Figure 18C:
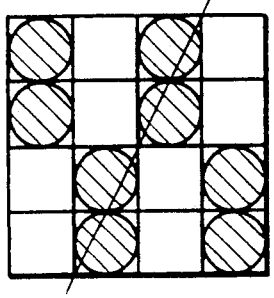
Figure 18D:
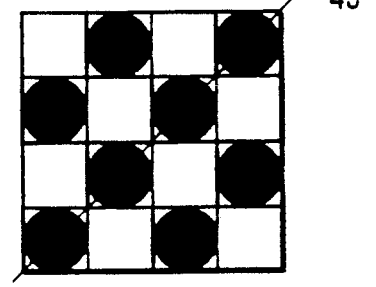

FIGS. 12 and 13 respectively show fourth tone transformation characteristics A and B which are different from the third tone transformation characteristic of FIG. 11.

It is common to the characteristics of FIGS. 12 and 13 that the tone transformation characteristic corresponding to a dot of an odd line having a lower priority starts growing in the course of continuous growth of a dot of an even line having a higher priority.

FIG. 12 is a graph for showing the fourth tone characteristic A which suppress the growth of a dot of a line having a higher priority and prevent occurrence of a "crush" at the highest density level. On the other hand, a dot of a line having a lower priority starts growing before the growth of a dot of a line having a higher priority enters a pseudo saturation region. Thus the tone reproducibility can be simultaneously improved.

FIG. 13 is a graph for showing the fourth tone transformation characteristic B. Basically, in case where the density levels of the input image are low, the tone reproduction is effected by inhibiting the printing or recording of pixels of each odd line having a lower priority and regulating the size of dots of each even line having a higher priority. On the other hand, in case where the density levels of the input image are medium or high, the tone reproduction is effected by recording dots corresponding to pixels of each even line of a higher priority using and maintaining an output level less than a predetermined maximum output level and by regulating the size of dots corresponding to pixels of each odd line of a lower priority.

Further, in case where the density levels of the input image are very high, dots corresponding to pixels of each even line of a higher priority are recorded or printed at the highest output level. On the other hand, dots corresponding to pixels of each odd line of a lower priority start growing before the growth of dots corresponding to pixels of each even line of a higher priority enters a pseudo saturation region.

The process of suppressing the growth of dots corresponding to pixels of a line having a higher priority can effectively constrain occurrence of a "crush" (namely, a phenomenon that dots corresponding to adjacent pixels overlap with each other in a density range of medium and high density levels and can improve the tone reproducibility in this density range.

Moreover, the process of recording dots at the highest density level when the density levels of the pixels having a higher priority are extremely high is performed only in case where the reproduction of a solid region having high density levels to be effected by using very high density levels is necessary.

On the other hand, dots of each odd line having a lower priority commences growing before the growth of dots of each even line having a higher priority enters a pseudo saturation region, so that the tone reproducibility in the density range of medium density levels can be improved.

As the result, suppression of occurrence of a "crush" can be achieved consistently with reproduction of a solid region of high densities positively utilizing a "crush". Moreover, the tone reproducibility can be improved even in a border portion between lines having different priorities.

In the foregoing description of this embodiment, the case where priorities are assigned to two pixels of adjacent lines has been described for simplicity of description. The present invention is not limited to such a case. Namely, the number of pixels of adjacent lines to which priorities are assigned may be other than two. Thus dots corresponding to a plurality of pixels having a higher priority may grow preferentially to dots corresponding to other pixels having lower priorities.

Further, for instance, in case where the tone reproduction is performed by assigning priorities to each set of fours lines, suppression of complete growth of a dot having the highest priority as well as suppression of complete growth dots other than dots having the lowest priority can easily be realized and changed. Further, the relation between given lines and priorities can easily be established by setting the contents of the table. Thus a priority can easily be assigned to each line. The modification of such an established relation can be very easily carried out by changing only the number of bits of each of the counters, a tone-transformation-table storing area of the number of output states of the counters and the contents of each of the tone transformation tables.

Moreover, in accordance with this embodiment, a dot having a higher priority and a dot having a lower priority form different groups each consisting of only one dot, with the result that resolution is substantially maintained. If priorities are assigned to line data of four lines, the size of a block on which visual tone modulation is performed is 1×4. Thus, in such a case, resolution is maintained at a very high level in comparison with a case where an ordinary dithering method using a dither matrix having 4×4 elements is employed and performed.

By the way, in case of an electrophotographic type printer, the tone reproducibility of an output image can be improved by assigning priorities to specific pixels as described above and making dots corresponding to the specific pixels preferentially grow so as to cause a strong electric field in a micro-region of an electrostatic latent image in comparison with a case that all dots are made to uniformly grow when forming pixels.

Generally, in case of a natural image, the correlation between adjacent pixels is very high. Therefore, in accordance with this embodiment, priorities (namely, a difference) relating to the growth of a dot can easily be given to pixels of each block or of each line. Thus improvement of the tone reproducibility can be achieved at a stage of a latent image. As a consequence, specific spatial frequency components are superposed on an image. Consequently, proof against, for instance, irregularity in a drive operation caused by a drive system can be improved.

Hence, this embodiment is a novel means for superposing a noise having specific spatial frequency component on an image. Further, this embodiment is characterized in that the level of the noise is not affected by a spatial periodic threshold established by, for example, a dither matrix but is resulted from the density levels (for instance, 256 levels) of pixels which is nearly equivalent to analog density. Thus, this embodiment differs much from the conventional tone reproduction method such as a conventional dithering method which provides discrete noise levels (e.g., four tone levels).

However, in case of this embodiment, the order of the growth of pixels of each block is not strictly assured. For example, a pixel having the lowest priority may start growing even when another pixel having the highest priority does not complete its growth. Especially, in a portion of an input image (for example, a steep edge portion of a character or a line drawing), at which the data thereof, namely, the tone or density level abruptly changes, the order of the growth of pixels may change depending on the way of establishing the block in such a portion.

Namely, it should be noted that the "priorities" employed in this embodiment do not determine the order of the growth of pixels but determine only the density levels (hereunder sometimes referred to as the input density levels) of the input image, at which the pixels grow. However, generally, the correlation between adjacent pixels in case of a natural image is very high. As a consequence, pixels concerned with the tone reproduction (namely, pixels on their way to growth) are selected according to the input density levels of a region which is spatially macro to some extent. Consequently, this embodiment has come to have the same effects as would be obtained if the order of the growth of the pixels is strictly determined.

Furthermore, the fact that the order of the growth of the pixels is not completely determined minimizes degradation of resolution. For instance, in case of a means which processes image data in each block somehow and assign a priority to the position of each pixel and rearrange the data according to the priorities, a weighting of data may be performed with regard to a position at which no image data is actually present or only data indicating a small value is present. Thus resolution is surely degraded in case of such a means. In contrast, in case of this embodiment, resolution is not degraded because a pixel surely grows when the pixel has a high density level to some extent (note that characters and line drawings are usually output-at the highest density) even if the pixel is contained in, for instance, a line drawing.

Additionally, in case of this embodiment, the densities of all ranges can be controlled in the same manner as in case of analog density from the viewpoint of visual characteristics. Thus a singular recorded dot of a high density level hardly appears in a white ground. Further, this embodiment can prevent occurrence of coarse sub-patterns or a texture, especially, in a portion of low densities in a smooth image like a natural image. Consequently, the tone reproducibility can be considerably improved in the portion of low densities.

Namely, this embodiment makes much of the tone reproducibility in case of performing the tone reproduction of a smooth image (especially, a portion of low densities thereof). However, in case of performing the tone reproduction of a portion having usually high densities (for example, characters and line drawings), this embodiment makes much of resolution.

Additionally, this embodiment is further characterized in that in the process of growth of dots each having a priority, during a dot of an even line (namely, a line having a higher priority) is growing, another dot of the next line, (namely, an odd line having a lower priority) commences growing.

In principle, a dot-having a lower priority may start growing immediately after the growth of another dot having a higher priority is finished. However, generally, in case where the tone transformation characteristic is set in such a manner to secure a region of high densities to a certain degree, an overlap between adjoining dots becomes larger in a portion of high densities and the visually recognized density becomes made even in the portion of high densities. Therefore, the tone reproducibility is degraded in a connection portion between a domain in which a dot having a higher priority finishes its growth and another domain in which another dot having a lower priority starts growing.

In contrast, change in tone can be smoothed or corrected in such a connection portion by starting the growth of a dot of having a lower priority while a dot having a high priority is growing.

Next, another embodiment employing a fifth tone transformation characteristic will be described hereinbelow in detail by referring to FIGS. 14 and 15. FIG. 14 shows the contents of a tone transformation table employed in this embodiment. In case where the data represented by the input image signal is 8 bits in length and thus can represent 256 tone levels, 256 addresses or locations of the table are required for indicating the tone transformation characteristic corresponding to a pixel. In this embodiment, each pixel has one of four tone transformation characteristics respectively corresponding to the positions A, B, C and D. Thus total 1024 addresses are required for indicating the tone transformation characteristics respectively corresponding to four pixels of each group.

Namely, the data indicating the tone characteristic corresponding to the position A is stored at addresses in hexadecimal representation 000H-0FFH. Further, the data indicating the tone characteristic corresponding to the position C is stored at addresses in hexadecimal representation 100H-1FFH. Moreover, the data indicating the tone characteristic corresponding to the position B is stored at addresses in hexadecimal representation 200H-2FFH. Furthermore, the data indicating the tone characteristic corresponding to the position D is stored at addresses in hexadecimal representation 300H-3FFH.

FIG. 15 is a graph for showing the fifth tone transformation characteristic in this embodiment. In this embodiment, the priority of the position A is set to be higher than those of the positions B, C and D. Further, the position B has the second highest priority and the position C has the third highest priority. Moreover, the priority of the position D is set to be lower than those of the positions A, B and C.

In case of the tone characteristic corresponding to the position A, namely, corresponding to the pixel having the highest priority, the output continuously increases while the tone level of this pixel of the input image varies from 00H to 52H in hexadecimal representation, but the output is fixedly set to be FFH when the tone level of this pixel exceeds 53H.

Further, in case of the tone characteristic corresponding to the position B, namely, corresponding to the pixel having the second highest priority, the output is 00H when the tone level of this pixel is less than 53H, and then the output continuously increases while the tone level of this pixel of the input image varies from 53H to A5H, but the output is fixedly set to be FFH when the tone level of this pixel exceeds A5H.

Moroever, in case of the tone characteristic corresponding to the position C, namely, corresponding to the pixel having the third highest priority, the output is 00H when the tone level of this pixel is less than A6H, and then the output continuously increases while the tone level of this pixel of the input image varies from A6H to F8H, but the output is fixedly set to be FFH when the tone level of this pixel exceeds F8H.

Furthermore, in case of the tone characteristic corresponding to the position D, namely, corresponding to the pixel having the lowest priority, the output is 00H when the tone level of this pixel is less than F9H, and the output is FFH when the tone level exceeds F9H. In this way, at the position D (namely, at the position corresponding to the lowest priority), a binary recording or printing is performed differently from the other positions A, B and C.

As described above, in case of an electrophotographic type printer, the tone reproducibility of an output image can be improved by assigning priorities to specific pixels and making dots corresponding to the specific pixels preferentially grow so as to cause a strong electric field in a micro-domain of an electrostatic latent image in comparison with a case that all dots are made to uniformly grow when forming pixels.

Generally, in case of a natural image, the correlation between adjacent pixels is very high. Therefore, in accordance with this embodiment, priorities (namely, a difference) relating to the growth of a dot can easily be given to pixels of each block or of each line. Thus improvement of the tone reproducibility can be achieved at a stage of a latent image. As a result, specific spatial frequency components are superposed on an image. Consequently, proof against, for instance, irregularity in a drive operation caused by a drive system can be improved. In other words, this embodiment is a novel means for superposing a noise having specific spatial frequency component on an image. Further, this embodiment is characterized in that the level of the noise is not affected by a spatial periodic threshold established by, for example, a dither matrix but is resulted from many density levels (for instance, 256 levels) of pixels which is nearly equivalent to analog density. Thus, this embodiment differs much from the conventional tone reproduction method such as a conventional dithering method which provides discrete noise levels (e.g., four tone levels).

By the way, in case of this embodiment, the order of the growth of pixels of each block is not strictly assured. For example, a pixel having the lowest priority may start growing even when another pixel having the highest priority does not complete its growth. Especially, in a portion of an input image (for example, a steep edge portion of a character or a line drawing), at which the data thereof, namely, the tone or density level abruptly changes, the order of the growth of pixels may change depending on the way of establishing the block in such a portion.

Namely, note that the "priorities" employed in this embodiment do not determine the order of the growth of pixels but determine only the input density levels of the input image, at which the pixels grow. However, generally, the correlation between adjacent pixels in case of a natural image is very high. As a consequence, pixels concerned with the tone reproduction (namely, pixels on their way to growth) are selected according to the input density levels of a region which is spatially macro to some extent. Consequently, this embodiment has come to have the same effects as would be obtained if the order of the growth of the pixels is strictly determined.

Furthermore, the fact that the order of the growth of the pixels is not completely determined minimizes degradation of resolution.

For instance, in case of a means which processes image data in each block somehow and assign a priority to the position of each pixel and re-arrange the data according to the priorities, a weighting of data may be performed with regard to a position at which no image data is actually present or only data indicating a small value is present. Thus resolution is surely degraded in case of such a means. In contrast, in case of the techniques employed in this embodiment, it has come that resolution is not degraded because a pixel surely grows when the pixel has a high density level to some extent (incidentally, characters and line drawings are usually output at the highest density) even if the pixel is contained in, for instance, a line drawing.

Further, in case of this embodiment, the densities of all ranges can be controlled in the same manner as in case of analog density from the viewpoint of visual characteristics. Thus a singular recorded dot of a high density level hardly appears in a white ground. Further, this embodiment can prevent occurrence of coarse sub-patterns or a texture, especially, in a portion of low densities in a smooth image like a natural image. Consequently, the tone reproducibility can be considerably improved in the portion of low densities.

Namely, the techniques employed in this embodiment makes much of the tone reproducibility in case of performing the tone reproduction of a smooth image (especially, a portion of low densities thereof). However, in case of performing the tone reproduction of a portion having usually high densities (for example, characters and line drawings), the techniques employed in this embodiment makes much of resolution.

As described above, in case of a natural image, the correlation between adjacent pixels is very high. Thus the process of effecting a binary recording of pixels having the lowest priority is performed in case where the density is very high in a relatively broad region of an image. Practically, as shown in FIG. 15, three quarters pixels surrounding the pixel having the lowest priority have already grown up when recording the pixels having the lowest priority. Therefore, the density of this region is relatively high (incidentally, a "crush" is relatively hard to occur due to a non-printed portion (namely, a quarter the pixels surrounding the pixel having the lowest priority)).

As is well known, the tone reproducibility in a region of high densities is not so important for the visual characteristics in comparison with that in another region of low densities. If a dot of the highest density is suddenly formed under such a condition, it scarcely has no evil influence such as what is called a pseudo contour (i.e., what is called a tone skip). On the contrary, if the binary recording of the dot having the lowest priority, a pixel of the highest density can be formed correspondingly only to a case where the tone reproduction of an image having very high densities (e.g., a high-density solid printing portion) is necessary.

Therefore, in accordance with this embodiment, suppression of occurrence of a "crush" can be achieved consistently with reproduction of a solid portion of high densities positively utilizing a "crush". Namely, this embodiment can effectively eliminate the above described drawbacks of the conventional device.

Further, other embodiments employing a sixth tone transformation characteristic will be described hereinbelow by referring to FIGS. 16 and 17.

It is common to the embodiments employing the characteristics of FIGS. 16 and 17 that the characteristics of FIGS. 16 and 17 are set in such a manner that there is no regions in which a dot having the lowest priority continuously grows and instead, a binary recording of the dot is effected.

FIG. 16 is a graph for showing the sixth tone transformation characteristic I. The sixth tone transformation characteristic I of this figure positively suppresses the growth of dots corresponding to, for instance, the positions A and C having the specific priorities. Thereby, pixels are formed correspondingly to a case where the tone reproduction of an image using the highest density such as a high-density solid printing portion is necessary. Further, in a range of medium tone levels, occurrence of what is called a "crush" can further effectively be suppressed.

FIG. 17 is a graph for showing the sixth tone transformation characteristic II. The sixth tone transformation characteristic II of this figure is established in such a fashion that dots corresponding to the positions having low priorities other than the dots having the lowest priority to be printed by effecting the binary recording start growing before the density of dots having higher priorities reach the highest density. Thus, in a border between positions having different tone transformation characteristics, the tone reproducability can be preferably corrected.

Apparently, it is possible to combine the sixth tone transformation characteristic I with the sixth tone transformation characteristic II. In such a case, the tone reproducability can be improved in a border portion between the growing pixels having different priorities. Further, occurrence of a "crush" can be suppressed in a region of medium and high densities. Moreover, when printing a solid portion, the highest density can be secured for printing the solid portion.

On the other hand, a process of constraining the growth of a pixel having a high priority can effectively suppress occurrence of a "crush" and can improve the tone reproducability. Further, a process of recording or printing a dot at the highest output density level when the tone level of the pixel having a high priority of the input image is very high is performed only when tone reproduction using a very high tone level is necessary for printing a solid region having very high tone levels. Thereby, in a border region between pixels having different priorities, the tone reproducability of an output image can be improved. Moreover, suppression of occurrence of what is called a "crush" can be achieved consistently with reproduction of a solid region of high densities positively utilizing a "crush".

Incidentally, the techniques employed in these embodiments can be applied to any case of employing a block of given size. Further, the relation between the priorities and the positions of pixels of each block and the number of pixels corresponding to dots which are preferentially made to grow can be easily altered. Such alteration can be very easily realized only by changing the number of bits counted by the counters according to according to the size of the block (incidentally, the size in a direction of the block may be different from that in another direction thereof) and securing a tone-transformation-table storing area of the number of output states of the counters and modifying the contents of each of the tone transformation tables.

Incidentally, what is called a "screen angle technique" employed in a binary dithering method and a multi-level dithering method is sometimes used for avoiding occurrence of a moire fringe in the tone modulation processing.

Hereinafter, the tone modulation processing on a color image will be described.

First, pixels of a block is classified into two groups. Namely, pixels of a first group should be made to grow earlier than pixels of a second group. How the pixels of the block are classified Into the first and second groups varies according to colors used for printing dots, namely, yellow (Y), magenta (M), cyan (C) and black (Bk) as illustrated in FIGS. 18(1)–18(4). Thus screen angles 0, 26.4°, 63.4° and 45° are formed correspondingly to colors (hereunder sometimes referred to as recording colors) Y, M, C and Bk, respectively, so as to avoid occurrence of a moire fringe due to interference among the recording colors.

Then, data indicating densities of the pixels of the first and second groups corresponding to each recording color and to each address are converted into data represented by a level signal for actually driving a laser (e.g., pulse amplitude data) by using a tone transformation table stored in the device 35. One of the simplest transformation techniques with high reliability is as follows. Namely, the data Used for this transformation are preliminarily written to ROM or RAM. Then, the stored data are accessed by data formed from information on the position of pixels of a block and information on tone levels represented by an input image signal as memory address data.

Figure 19:
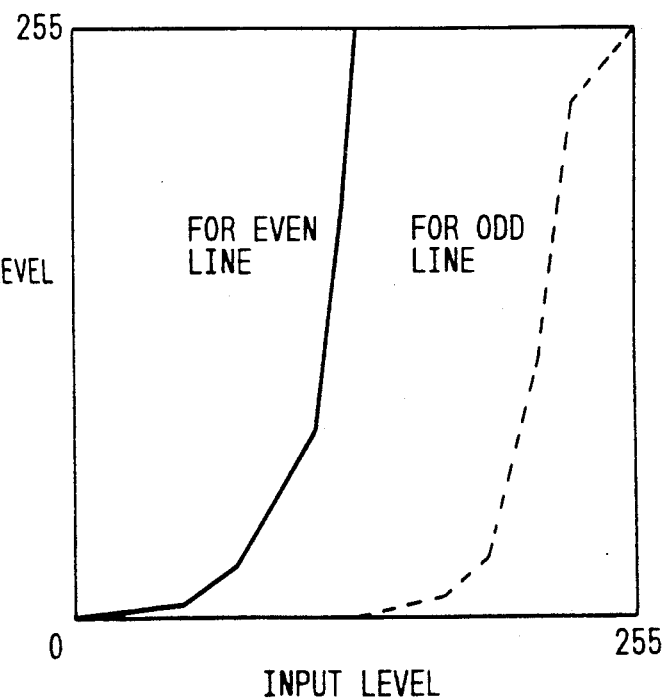
FIG. 19 is a graph for showing a characteristic of another tone transformation table.

Next, FIG. 18 shows the tone transformation characteristic employed for pixels of the first group (for example, pixels of an even line) and represented by the table stored in the device 35. Further, FIG. 19 shows the tone transformation characteristic employed for pixels of the second group (for example, pixels of an odd line) and also represented by the table stored in the device 35.

The data thus obtained correspondingly to each address of a block and used for actually driving a laser are once stored in a memory.

These embodiments classify spatial positions of image data into pixels to be made to earlier grow (i.e., pixels of the first group) and pixels to be made to later grow (i.e., pixels of the second group) and forcibly concentrate data on the pixels of the first group. Thus these embodiments have a profound effect that a strong electric field can be caused in a micro-region of an electrostatic latent image formed on a photoreceptor. Further, these embodiments contribute to improvement of the tone reproducibility.

Incidentally, in the foregoing description of these embodiments, the block has 4 pixels in each of the primary and subordinate scanning directions. However, the size of the block is not limited thereto. Namely, the techniques employed in these embodiments can be applied to any case of employing a block of given size. Further, the number of pixels corresponding to dots which are preferentially made to grow can be easily altered. Moreover, occurrence of a moire fringe due to the interference among the recording colors can be prevented by changing the size of block according to the recording colors.

Thus, in accordance with these embodiments (i.e., the color image forming devices of the present invention), degradation of resolution as well as occurrence of a texture and a "crush" can be prevented. Further, a high-picture-quality color recorded image can be obtained over all ranges of densities.

Next, a laser beam printer (LBP) employing the techniques used for performing the tone modulation processing in these embodiments will be described in detail hereinbelow by referring to FIGS. 20 to 22.

The LBP for forming a color image by application of electrophotographic process techniques employs the following process of forming a color image. Namely, rays of light respectively corresponding to each of the recording colors are selectively irradiated on a photoreceptor having a photosensitive layer to form an image thereon. Then, a plurality of electrostatic latent images respectively corresponding to specific ones of predetermined color components are developed by using predetermined toners, respectively. Subsequently, a color image is formed on a sheet of toner transfer material by making the monochromatic toner images overlap with each other.

Figure 20:
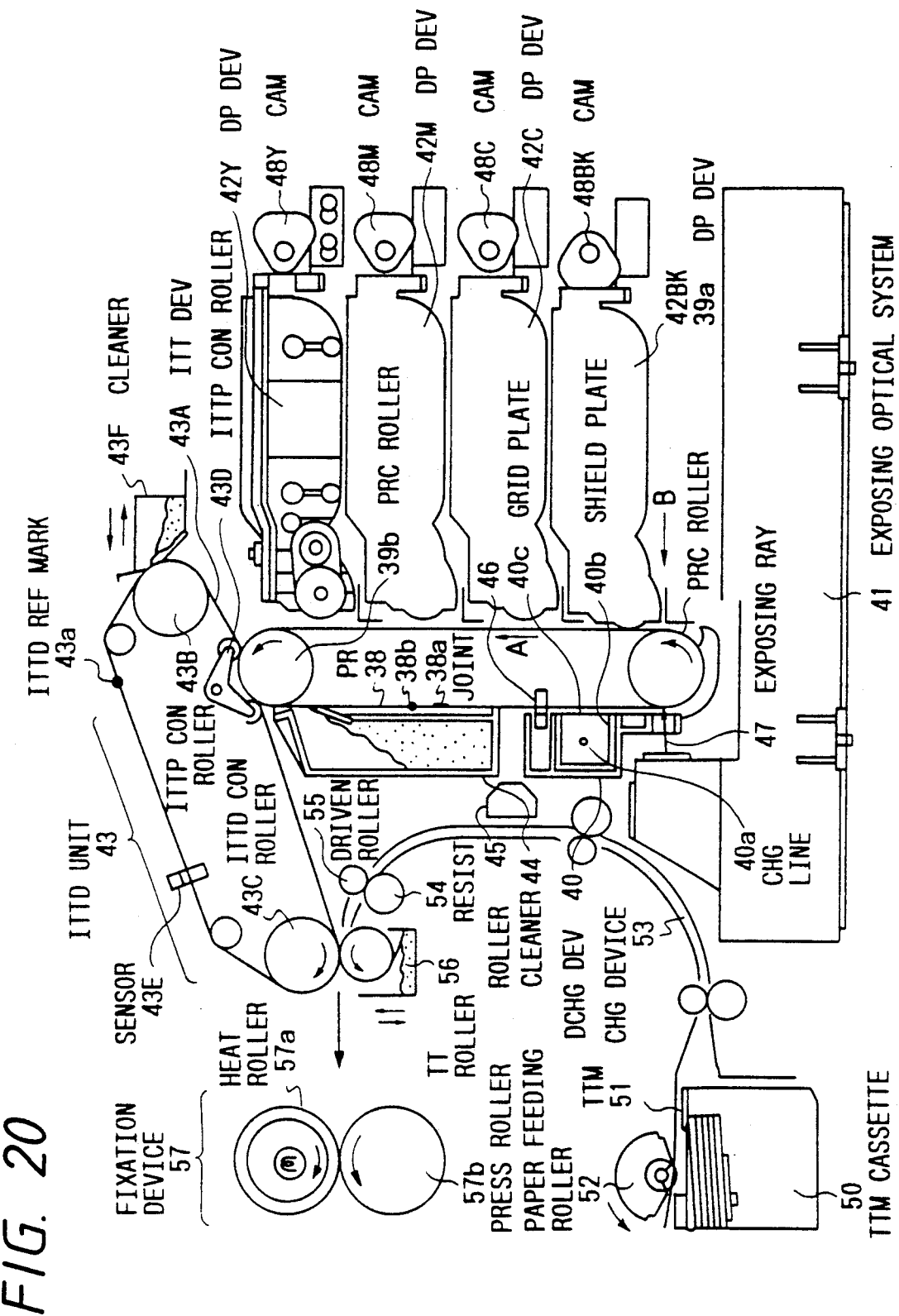
FIG. 20 is a side view of a primary part of a laser beam printer embodying the present invention.

FIG. 20 is a side view of a primary part of the LBP. Further, FIG. 21 is a perspective view of a primary part of a photoreceptor reference detecting mechanism. Moreover, FIG. 22 is a perspective view of a primary part of an intermediate toner transfer device reference detecting mechanism.

In FIG. 20, reference numeral 38 indicates a belt-like photoreceptor which a photosensitive layer made of selenium (Se), organic photoconductive (OPC) material or the like is coated like a thin-film on an outer surface of a closed-looplike belt base member made of resin or the like having a joint or seam 38a. This belt-like photoreceptor 38 is supported by two conveying rollers 39a and 39b in such a manner to form a vertical plane. The rollers are rotated by a drive motor (not shown). Thus, the belt-like photoreceptor 38 is fed to the direction indicated by an arrow A and rotates around the rollers.

On an outer surface of the photoreceptor 38, a charging device 40, an optical system 41 for exposure, developing devices 42Bk, 42C, 42M and 42Y respectively corresponding to the recording colors, namely, black (Bk), cyan (C), magenta (M) and yellow (Y), an intermediate toner transfer unit 43, a photoreceptor cleaning device 44, a discharging device 45 and a photoreceptor reference detecting sensor 46 are provided in this order in the direction of rotation of the photoreceptor as indicated by the arrow A.

Each of the developing devices 42Bk to 42Y contains toner corresponding to a corresponding kind of the recording colors. The selection of the recording color is performed by selecting one of the developing devices (e.g., the device 42Bk) and making the selected developing device touch the photoreceptor 38. The developing devices (e.g., 42C, 42M and 42Y in this case) other than the selected one are separated from the photoreceptor 38. Further, the selection of the developing device is effected by making cams 48Bk, 48C, 48M and 48Y, each of which corresponds to a corresponding one kind of the recording colors and is rotatably supported at both ends thereof by axes of the body of the LBP, rotate in response to a color selecting signal.

The charging device 40 is composed of a charging line 40a, which is made of a tungsten wire, a shield plate 40b and a grid plate 40c which are made of metal plates. When high voltage is applied to the charging line 40a, a corona discharge is caused by the charging line 40a. Thus the photoreceptor 38 is uniformly charged by way of the grid plate 40c.

Reference numeral 47 designates a ray of light emitted from the optical system 41 for exposure of image data. In this LBP, the ray 47 is obtained by applying to a semiconductor laser (not shown) an image signal obtained as the result of light-intensity modulation and pulse-amplitude modulation performed by a laser drive circuit (not shown) on an output signal of the tone modulation processing device. Further, the ray 47 forms a plurality of electrostatic latent images respectively corresponding to specific ones of the predetermined color components on the photoreceptor 38.

Figure 21:
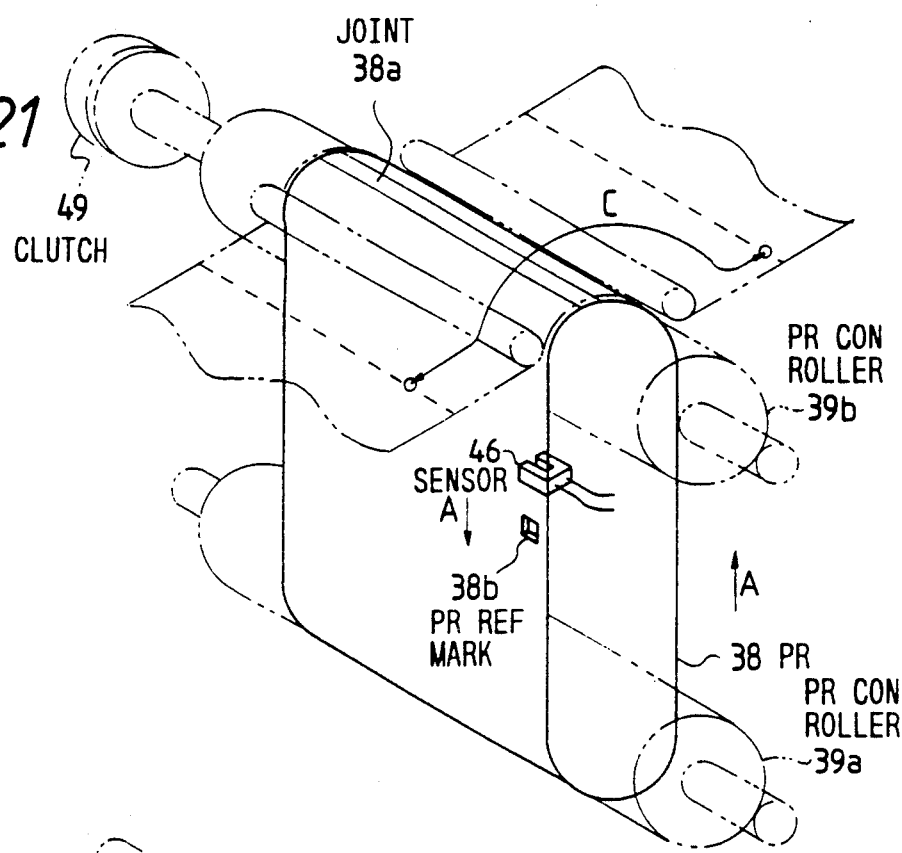
FIG. 21 is a perspective view of a primary part of a photoreceptor reference detecting mechanism.

As illustrated in FIG. 21, the photoreceptor reference detecting sensor 46 detects the position of the joint 38a of the photoreceptor 38. Namely, the sensor 46 detects a photoreceptor reference mark 38b formed at a predetermined position apart from the joint 38 formed on an end of the photoreceptor 38.

Reference numeral 49 denotes a photoreceptor clutch mechanism provided at an end of the drive shaft of the roller 39b, which connects to and disconnects from the drive shaft of the roller 39b driving force supplied from a driving force source (not shown) so as to control the rotational movement of the photoreceptor.

Turning back to FIG. 20, there is shown the intermediate toner transfer unit 43 comprised of a closed-loop-belt-like seam-less intermediate toner transfer device 43A made of conductive region or the like, two intermediate-toner-transfer-device conveying rollers 43B and 43C and an intermediate-toner-transfer-device transferring rollers 43D arranged facing the photoreceptor 38 and holding the intermediate toner transfer device 43A therebetween.

The circumference L1 of the photoreceptor 38 is nominally equal to that L2 of the intermediate toner transfer device 43A. Practically, the circumferences L1 and L2 are established in such a manner that the following inequality always holds within the dispersion of the circumferences: $L1 \leq L2$.

Figure 22:
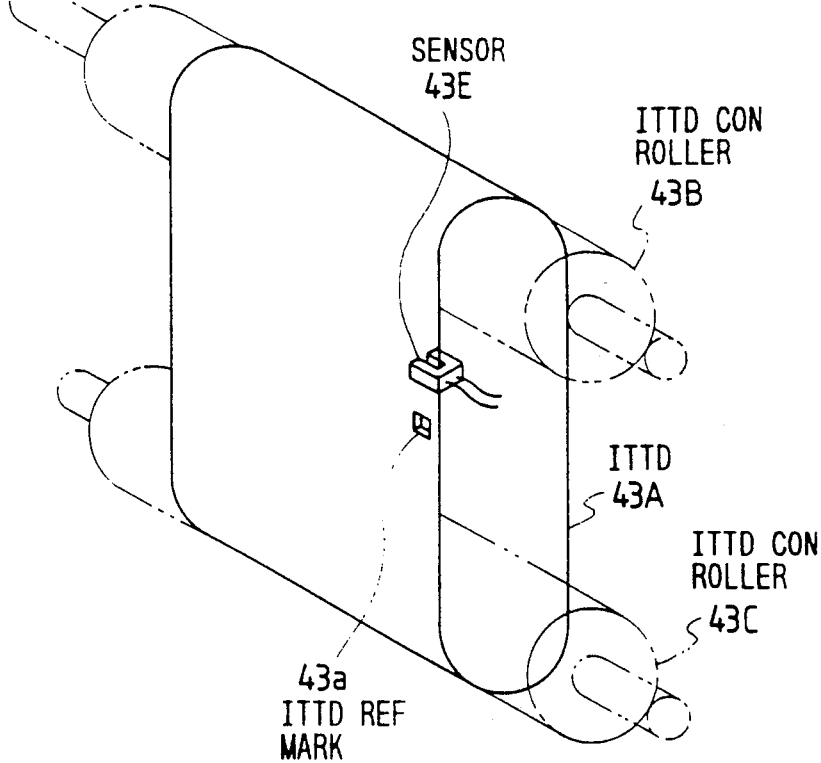
FIG. 22 is a perspective view of a primary part of an intermediate toner transfer device reference detecting mechanism.
Figure 23:
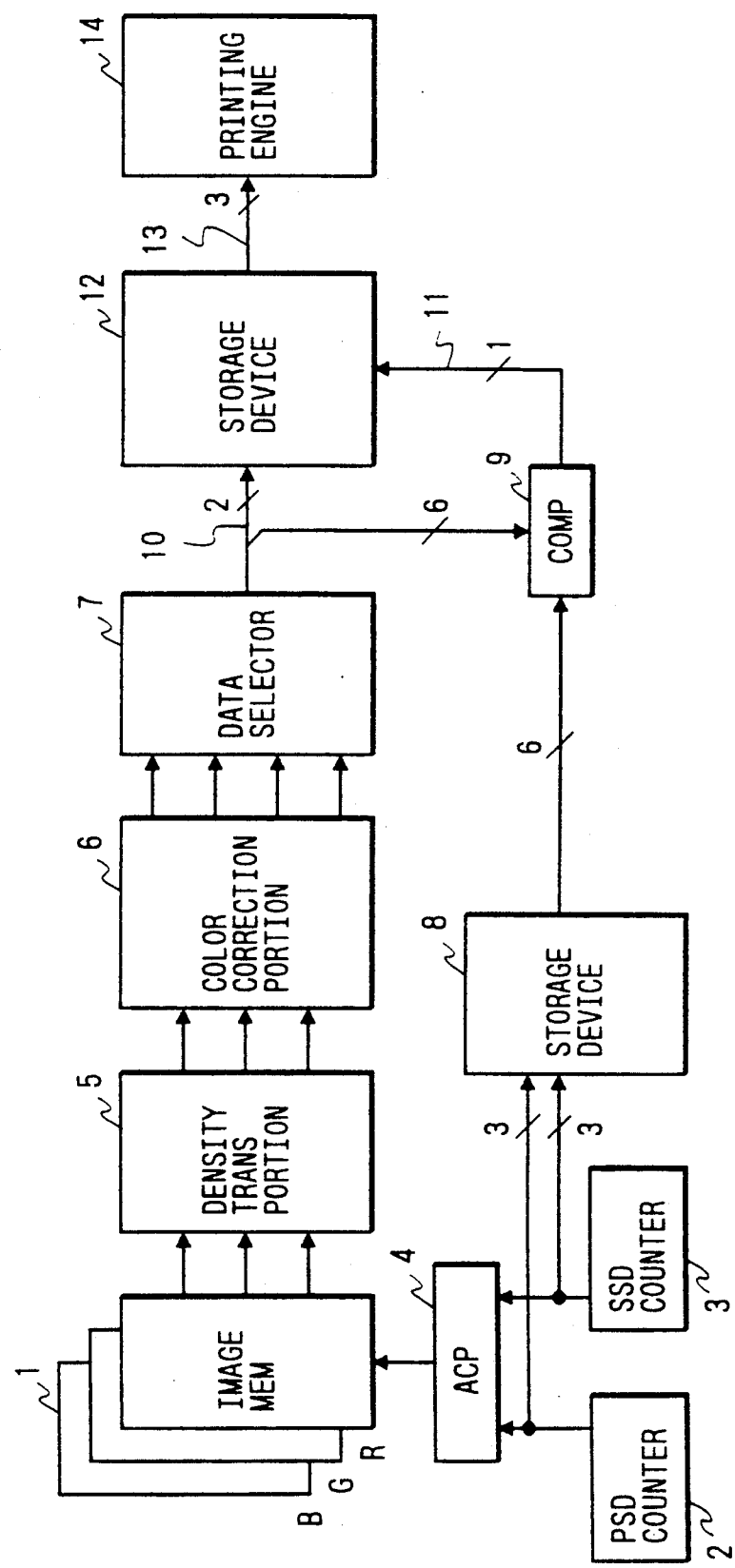
FIG. 23 is a schematic block diagram for illustrating the construction of a conventional image processor employing a multi-level dithering method.

Referring next to FIG. 22, reference numeral 43E denotes an intermediate-toner-transfer-device reference detecting sensor for detecting the reference position of the intermediate toner transfer device 43A on the basis of an intermediate-toner-transfer-device reference mark 43a such as a slit arranged on an end of the device 43A.

Turning back to FIG. 20 again, reference numeral 43F represents an intermediate-toner-transfer-device cleaning device for clearing away residual toner on the intermediate toner transfer device 43A. The device 43F is separated away from the device 43A when a synthetic image is being formed on the device 43A. In contrast, the device 43F is in contact with the device 43A only when cleaning the residual toner.

Reference numeral 50 indicates a toner transfer material cassette for accommodating a toner transfer material 51. Each sheet of the toner transfer material is fed from the cassette 50 by a crescent-shaped paper feeding roller 52 to a paper conveying path 53.

Reference numeral 54 denotes a resist roller for temporarily stopping the toner transfer material 51 in order to make synthetic images formed on the toner transfer material 51 and the intermediate toner transfer devices 43A accord with each other. This resist roller 54 is pressed against and is in contact with a driven roller 55. Further, reference numeral 56 indicates a toner transfer roller for transfer the synthetic image formed on the intermediate toner transfer device 43A to the toner transfer material 51. The toner transfer roller 56 comes in contact with the intermediate toner transfer device 43 A and rotates around an axis of rotation thereof only when transferring the synthetic image formed on the intermediate toner transfer device 43A to the toner transfer material 51.

Reference numeral 57 designates a fixation device comprised of a heat roller 57a having a heat source therein and a pressurizing roller 57b. The fixation device 57 forms a color image by fixing the transferred synthetic usage on the toner transfer material 51 by heat and pressure by putting the material 51 between the rollers 57a and 57b.

Hereinafter, an operation of the thus constructed LBP will be described.

The photoreceptor 38 and the intermediate toner transfer device 43A are driven by the corresponding driving force sources (not shown), respectively, and are controlled to rotate at the same constant rate. Further, an image forming region is preliminarily established on the device 43A by use of the sensor 43E for detecting the reference mark 43b to determine a reference position. Moreover, the position of the device 43A is adjusted and the device 43A is driven in synchronization with the photoreceptor 38 and the roller 43D in such a manner that the image forming region, the joint 38a of the photoreceptor 38 and the roller 43D do not overlap with one another.

Under such a condition, high voltage is first applied to the charging line 40a of the charging device 40 connected to a high-voltage source so as to make the charging line 40a cause a corona discharge. Thus the surface of the photoreceptor 38 is uniformly charged in such a manner that the electric potential on the surface of the photoreceptor 38 is of from −700 volts (V) to −800 V or so.

Next, the photoreceptor 38 is made to rotate to the direction indicated by the arrow A. Further, the ray or laser beam 47 corresponding to a predetermined one (e.g., black (Bk) component) of the color components is irradiated on the uniformly charged surface of the photoreceptor 38. This results in that electric charges on the irradiated portion of the surface of the photoreceptor 38 are eliminated and an electrostatic latent image is formed thereon. At that time, the electrostatic latent image is formed in accordance with a signal issued by the sensor 43E in the image forming region preliminarily established on the device 43A in such a fashion no to overlap with the joint 38a of the photoreceptor 38.

On the other hand, the developing device 42Bk containing black toner for developing the latent image is pressed to the direction indicated by an arrow B by rotating the cam 48Bk in accordance with a color selecting signal so as to come in contact with the photoreceptor 38. As the result, the toner adheres to a portion, on which the latent image is formed, of the surface of the photoreceptor 38 so as to form a toner image thereon. Thus the development is finished. Upon completion of the development, the developing device 42Bk is separated from the photoreceptor 38 by rotating the cam 48Bk around the axis of rotation thereof by 180 degrees.

The toner image transferred onto the intermediate toner transfer device 43A by applying high voltage to the roller 43D arranged in such a way to touch the photoreceptor 38 correspondingly to each color. Then, the residual toner on the surface of the photoreceptor 38 is cleared away therefrom by the photoreceptor cleaning device 44. Moreover, the electric charges on the surface of the photoreceptor 38, from which the residual toner is cleared, are removed by the discharging device 45.

Next, if cyan (C) is selected, the cam 48C is rotated this time and thus the developing device 42C is pressed against the photoreceptor 38 in such a manner to come in contact therewith. Thus the development using cyan (C) is started. In case of employing the four kinds of colors, the foregoing development process is repeated four times. Consequently, the toner images of the colors Bk, C, M and Y formed on the intermediate toner transfer device 43A are overlapped with one another to form a synthetic image.

The thus formed synthetic image is transferred by pressure to the toner transfer material 51 fed along the paper conveying path 53 from the cassette 50 by making the roller 56 touch the device 43A and applying high voltage to the roller 56. Subsequently, the toner transfer material 51, onto which the toner image is transferred, is fed to the fixation device 57 whereupon the toner image is fixed by heat originated from the heat roller 57a and by pressure due to the pressurizing roller 57b. Finally, a resultant color image is outputted therefrom.

Thereafter, the residual toner on the intermediate toner transfer device is cleared away therefrom by the cleaning device 43F.

Incidentally, the cleaning device 43F is separated from the device 43A until a synthetic image is obtained. Furthermore, after the synthetic image is transferred onto the toner transfer material 51 by the roller 56, the cleaning device 43F comes in contact with the device 43A to clear the residual toner.

By performing the above described operation, a recording of an image is completed. Thus a high-picture-quality color recorded image is obtained.

Incidentally, the printer is not limited to the laser beam printer of the electrophotographic type of this embodiment and may be a thermal transfer printer, an ink jet printer or other kinds of printers of the electrophotographic type (namely, printers of the light emitting diode (LED) type and of the liquid crystal shutter type).

Further, this embodiment employs a full- color printer for which the tone reproduction is important. However, a monochromatic printer may be employed in this embodiment. Moreover, in this embodiment, a color image is overlapped on the intermediate toner transfer device. Instead, a color image may be overlapped on the photoreceptor or the toner transfer paper.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An image forming device for forming an image comprising a plurality of dots from input image data comprising a plurality of pixels, each of which having an image density, said image forming device, comprising:

block partitioning means for partitioning said input image data into blocks, each of said blocks having a predetermined number of pixels, each of said pixels having a predetermined position within each of said blocks; and tone modulation processing means for determining priorities corresponding to said predetermined positions of said pixels within each of said blocks and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels.

2. An image forming device for forming an image comprising a plurality of dots from input image data comprising a plurality of pixels, each of which having an image density, said image forming device, comprising:

block partitioning means for partitioning said input image data into blocks, each of said blocks having a predetermined number of pixels, each of said pixels having a predetermined position within each of said blocks; and tone modulation processing means for determining priorities corresponding to said predetermined positions of said pixels within each of said blocks and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein before the size of a dot corresponding to a pixel having a predetermined priority reaches the maximum size thereof, said tone modulation processing means increases the size of a dot corresponding to another pixel having the next priority lower than the predetermined priority.

3. An image forming device for forming an image comprising a plurality of dots from input image data comprising a plurality of pixels, each of which having an image density, said image forming device, comprising:
- block partitioning means for partitioning said input image data into blocks, each of said blocks having a predetermined number of pixels, each of said pixels having a predetermined position within each of said blocks; and
- tone modulation processing means for determining priorities corresponding to said predetermined positions of said pixels within each of said blocks and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein said tone modulation processing means limits the size of a dot corresponding to a pixel having a predetermined priority to predetermined size.

4. An image forming device for forming an image comprising a plurality of dots from input image data comprising a plurality of pixels, each of which having an image density, said image forming device, comprising:
- block partitioning means for partitioning said input image data into blocks, each of said blocks having a predetermined number of pixels, each of said pixels having a predetermined position within each of said blocks; and
- tone modulation processing means for determining priorities corresponding to said predetermined positions of said pixels within each of said blocks and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein said tone modulation processing means selects the size of a dot corresponding to a pixel having the lowest priority from a predetermined two kinds of a size according to the density of the pixel having the lowest priority.

5. An image forming device for forming an image comprising a plurality of dots from input color image data comprising a plurality of pixels, each of which having an image density, said image forming device, comprising:
- block partitioning means for partitioning said input color image data into blocks, each of said blocks having a predetermined number of pixels, each of said pixels having a predetermined position within each of said blocks; and
- tone modulation processing means for determining priorities corresponding to said predetermined positions of said pixels within each of said blocks and corresponding to recording colors used to record the pixels and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels.

6. An image forming device for forming an image comprising a plurality of dots from input color image data comprising a plurality of pixels, each of which having an image density, said image forming device, comprising:
- block partitioning means for partitioning said input color image data into blocks, each of said blocks having a predetermined number of pixels, each of said pixels having a predetermined position within each of said blocks; and
- tone modulation processing means for determining priorities corresponding to said predetermined positions of said pixels within each of said blocks and corresponding to recording colors used to record the pixels and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein before the size of a dot corresponding to a pixel having a predetermined priority reaches the maximum size thereof, said tone modulation processing means increases the size of a dot corresponding to another pixel having the next priority lower than the predetermined priority.

7. An image forming device for forming an image comprising a plurality of dots from input color image data comprising a plurality of pixels, each of which having an image density, said image forming device, comprising:
- block partitioning means for partitioning said input color image data into blocks, each of said blocks having a predetermined number of pixels, each of said pixels having a predetermined position within each of said blocks; and
- tone modulation processing means for determining priorities corresponding to said predetermined positions of said pixels within each of said blocks and corresponding to recording colors used to record the pixels and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein said tone modulation processing means limits the size of a dot corresponding to a pixel having a predetermined priority to predetermined size.

8. An image forming device for forming an image comprising a plurality of dots from input color image data comprising a plurality of pixels, each of which having an image density, said image forming device, comprising:

block partitioning means for partitioning said input color image data into blocks, each of said blocks having a predetermined number of pixels, each of said pixels having a predetermined position within each of said blocks; and tone modulation processing means for determining priorities corresponding to said predetermined positions of said pixels within each of said blocks and corresponding to recording colors used to record the pixels and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein said tone modulation processing means limits the size of a dot corresponding to a pixel having the lowest priority from a predetermined two kinds of size according to the density of the pixel having the lowest priority.

9. An image forming device for forming an image comprising a plurality of dots from input color image data comprising a plurality of pixels, each of which having an image density, said image forming device, comprising:

block partitioning means for partitioning said input color image data corresponding to recording colors used to record pixels into blocks, each of said blocks having a predetermined number of pixels, each of said pixels having a predetermined position within each of said blocks; and tone modulation processing means for determining priorities corresponding to said predetermined positions of said pixels within each of said blocks and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels.

10. An image forming device for forming an image comprising a plurality of dots from input color image data comprising a plurality of pixels, each of which having an image density, said image forming device, comprising:

block partitioning means for partitioning said input color image data corresponding to recording colors used to record pixels into blocks, each of said blocks having a predetermined number of pixels, each of said pixels having a predetermined position within each of said blocks; and tone modulation processing means for determining priorities corresponding to said predetermined positions of said pixels within each of said blocks and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein before the size of a dot corresponding to a pixel having a predetermined priority reaches the maximum size thereof, said tone modulation processing means increases the size of a dot corresponding to another pixel having the next priority lower than the predetermined priority.

11. An image forming device for forming an image comprising a plurality of dots from input color image data comprising a plurality of pixels, each of which having an image density, said image forming device, comprising:

block partitioning means for partitioning said input color image data corresponding to recording colors used to record pixels into blocks, each of said blocks having a predetermined number of pixels, each of said pixels having a predetermined position within each of said blocks; and tone modulation processing means for determining priorities corresponding to said predetermined positions of said pixels within each of said blocks and corresponding to recording colors used to record the pixels and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein said tone modulation processing means limits the size of a dot corresponding to a pixel having a predetermined priority to predetermined size.

12. An image forming device for forming an image comprising a plurality of dots from input color image data comprising a plurality of pixels, each of which having an image density, said image forming device, comprising:

block partitioning means for partitioning said input color image data corresponding to recording colors used to record pixels into blocks, each of said blocks having a predetermined number of pixels, each of said pixels having a predetermined position within each of said blocks; and tone modulation processing means for determining priorities corresponding to said predetermined positions of said pixels within each of said blocks and corresponding to recording colors used to record the pixels and for changing the size of said dots according to the image densities of said pixels within said block by increasing the size of said dots corresponding to said pixels in such a manner that the size of one of said dots corresponding to one of said pixels is larger than that of another one of said dots corresponding to another one of said pixels having a lower priority that said one of said pixels and the same image density as said one of said pixels, wherein said tone modulation processing means limits the size of a dot corresponding to a pixel having a the lowest priority from a predetermined two kinds of size according to the density of the pixel having the lowest priority.

13. The image forming device as set forth in claim 3, wherein said tone modulation processing means makes the size of the dot corresponding to the pixels having the predetermined priority equal to the predetermined size if the density of the pixel having the predetermined priority is equal to or more than a predetermined density.

14. The image forming device as set forth in claim 7, wherein said tone modulation processing means makes the size of the dot corresponding to the pixels having the predetermined priority equal to the predetermined size if the density of the pixel having the predetermined priority is equal to or more than a predetermined density.

15. The image forming device as set forth in claim 11, wherein said tone modulation processing means makes the size of the dot corresponding to the pixels having the predetermined priority equal to the predetermined size if the density of the pixel having the predetermined priority is equal to or more than a predetermined density.

16. An image forming device for performing gradational recording by changing the size of each individual dot according to input image data comprising:
    a block partitioning means for partitioning the input image data into a plurality of blocks in such a manner that each of the blocks has a plurality of pixels; and
    a tone modulation processing means for determining the size of dots which should be printed, by making different input-image-tone-level-to-output-level characteristics correspond to the positions of the pixels of each of the blocks and then determining an output level of a dot corresponding to each pixel of each block corresponding to an input image tone level thereof according to the corresponding characteristic and for printing the dot of each of the pixel of each block.

17. An image forming device for performing gradational recording by changing the size of each individual dot according to input image data, comprising:
    a block partitioning means for partitioning the input image data into a plurality of blocks in such a manner that each of the blocks has a plurality of pixels; and
    a tone modulation processing means for determining the size of dots which should be printed, by making different input-image-tone-level-to-output-level characteristics correspond to the positions of the pixels of each of the blocks and then determining an output level of a dot corresponding to each pixel of each block corresponding to an input image tone level thereof according to the corresponding characteristic and for printing the dot of each of the pixel of each block, wherein the size of a dot corresponding to a pixel which corresponds to one of the characteristics having a high output level next to another specific one of the characteristics corresponding to each input image tone level, increases before the size of a dot corresponding to a pixel which corresponds to the specific one of the characteristics reaches the maximum size thereof.

18. An image forming device for performing gradational recording by changing the size of each individual dot according to input image data, comprising:
    a block partitioning means for partitioning the input image data into a plurality of blocks in such a manner that each of the blocks has a plurality of pixels; and
    a tone modulation processing means for determining the size of dots which should be printed, by making different input-image-tone-level-to-output-level characteristics correspond to the positions of the pixels of each of the blocks and then determining an output level of a dot corresponding to each pixel of each block corresponding to an input image tone level thereof according to the corresponding characteristic and for printing the dot of each of the pixel of each block, wherein said tone modulation processing means limits the maximum size of the dot corresponding to the pixel corresponding to the specific one of the characteristics to predetermined size.

19. An image forming device for performing gradational recording by changing the size of each individual dot according to input image data, comprising:
    a block partitioning means for partitioning the input image data into a plurality of blocks in such a manner that each of the blocks has a plurality of pixels; and
    a tone modulation processing means for determining the size of dots which should be printed, by making different input-image-tone-level-to-output-level characteristics correspond to the positions of the pixels of each of the blocks and then determining an output level of a dot corresponding to each pixel of each block corresponding to an input image tone level thereof according to the corresponding characteristic and for printing the dot of each of the pixel of each block, wherein the size of a dot corresponding to a pixel which corresponds to one of the characteristics having the lowest output level corresponding to each input image tone level is a binary size corresponding to the density of the input image data.

20. An image forming device for performing gradational recording by changing the size of each individual dot according to input color image data, comprising:
    a block partitioning means for partitioning the input color image data into a plurality of blocks in such a manner that each of the blocks has a plurality of pixels; and
    a tone modulation processing means for determining the size of dots which should be printed, by making different input-image-tone-level-to-output-level characteristics correspond to the positions of the pixels of each of the blocks in such a manner that the different characteristics correspond to different colors, and then determining an output level of a dot corresponding to each pixel of each block corresponding to an input image tone level thereof according to the corresponding characteristic and for printing the dot of each of the pixel of each block.

21. An image forming device for performing gradational recording by changing the size of each individual dot according to input color image data, comprising:
    a block partitioning means for partitioning the input color image data into a plurality of blocks in such a manner that each of the blocks has a plurality of pixels; and
    a tone modulation processing means for determining the size of dots which should be printed, by making different input-image-tone-level-to-output-level characteristics correspond to the positions of the pixels of each of the blocks in such a manner that the different characteristics correspond to different colors, and then determining an output level of a dot corresponding to each pixel of each block corresponding to an input image tone level thereof according to the corresponding characteristic and for printing the dot of each of the pixel of each block, wherein the size of a dot corresponding to a pixel which corresponds to one of the characteristics having a high output level next to another specific one of the characteristics corresponding to each input image tone level, increases before the size of a dot corresponding to a pixel which corresponds to the specific one of the characteristics reaches the maximum size thereof.

22. An image forming device for performing gradational recording by changing the size of each individual dot according to input color image data, comprising:
- a block partitioning means for partitioning the input color image data into a plurality of blocks in such a manner that each of the blocks has a plurality of pixels; and
- a tone modulation processing means for determining the size of dots which should be printed, by making different input-image-tone-level-to-output-level characteristics correspond to the positions of the pixels of each of the blocks in such a manner that the different characteristics correspond to different colors, and then determining an output level of a dot corresponding to each pixel of each block corresponding to an input image tone level thereof according to the corresponding characteristic and for printing the dot of each of the pixel of each block, wherein said tone modulation processing means limits the maximum size of the dot corresponding to the pixel corresponding to the specific one of the characteristics to predetermined size.

23. An image forming device for performing gradational recording by changing the size of each individual dot according to input color image data, comprising:
- a block partitioning means for partitioning the input color image data into a plurality of blocks in such a manner that each of the blocks has a plurality of pixels; and
- a tone modulation processing means for determining the size of dots which should be printed, by making different input-image-tone-level-to-output-level characteristics correspond to the positions of the pixels of each of the blocks in such a manner that the different characteristics correspond to different colors, and then determining an output level of a dot corresponding to each pixel of each block corresponding to an input image tone level thereof according to the corresponding characteristic and for printing the dot of each of the pixel of each block, wherein the size of a dot corresponding to a pixel which corresponds to one of the characteristics having a lowest output level corresponding to each input image tone level is a binary size corresponding to the density of the input image data.

24. An image forming device for performing gradational recording by changing the size of each individual dot according to input color image data, comprising:
- a block partitioning means for partitioning the input color image data into a plurality of blocks in different manners corresponding to the colors in such a manner that each of the blocks has a plurality of pixels; and
- a tone modulation processing means for determining the size of dots which should be printed, by making different input-image-tone-level-to-output-level characteristics correspond to the positions of the pixels of each of the blocks in such a manner that the different characteristics correspond to different colors, and then determining an output level of a dot corresponding to each pixel of each block corresponding to an input image tone level thereof according to the corresponding characteristic and for printing the dot of each of the pixel of each block.

25. An image forming device for performing gradational recording by changing the size of each individual dot according to input color image data, comprising:
- a block partitioning means for partitioning the input color image data into a plurality of blocks in different manners corresponding to the colors in such a manner that each of the blocks has a plurality of pixels; and
- a tone modulation processing means for determining the size of dots which should be printed, by making different input-image-tone-level-to-output-level characteristics correspond to the positions of the pixels of each of the blocks in such a manner that the different characteristics correspond to different colors, and then determining an output level of a dot corresponding to each pixel of each block corresponding to an input image tone level thereof according to the corresponding characteristic and for printing the dot of each of the pixel of each block, wherein the size of a dot corresponding to a pixel which corresponds to one of the characteristics having a high output level next to another specific one of the characteristics corresponding to each input image tone level, increases before the size of a dot corresponding to a pixel which corresponds to the specific one of the characteristics reaches the maximum size thereof.

26. An image forming device for performing gradational recording by changing the size of each individual dot according to input color image data, comprising:
- a block partitioning means for partitioning the input color image data into a plurality of blocks in different manners corresponding to the colors in such a manner that each of the blocks has a plurality of pixels; and
- a tone modulation processing means for determining the size of dots which should be printed, by making different input-image-tone-level-to-output-level characteristics correspond to the positions of the pixels of each of the blocks in such a manner that the different characteristics correspond to different colors, and then determining an output level of a dot corresponding to each pixel of each block corresponding to an input image tone level thereof according to the corresponding characteristic and for printing the dot of each of the pixel of each block, wherein said tone modulation processing means limits the maximum size of the dot corresponding to the pixel corresponding to the specific one of the characteristics to predetermined size.

27. An image forming device for performing gradational recording by changing the size of each individual dot according to input color image data, comprising:
- a block partitioning means for partitioning the input color image data into a plurality of blocks in different manners corresponding to the colors in such a manner that each of the blocks has a plurality of pixels; and a tone modulation processing means for determining the size of dots which should be printed, by making different input-image-tone-level-to-output-level characteristics correspond to the positions of the pixels of each of the blocks in such a manner that the different characteristics correspond to different colors, and then determining an output level of a dot corresponding to each pixel of each block corresponding to an input image tone level thereof according to the corresponding characteristic and for printing the dot of each of the pixel of each block, wherein the size of a dot corresponding to a pixel which corresponds to one of the characteristics having the lowest output level corresponding to each input image tone level is a binary size corresponding to the density of the input image data.

28. The image forming device as set forth in claim 18, wherein the dot, the maximum size of which is limited to the predetermined size, corresponding to the pixel which corresponds to the specific one of the characteristics has the maximum size if the density of the pixel is equal to or more than a predetermined density.

29. The image forming device as set forth in claim 22, wherein the dot, the maximum size of which is limited to the predetermined size, corresponding to the pixel which corresponds to the specific one of the characteristics has the maximum size if the density of the pixel is equal to or more than a predetermined density.

30. The image forming device as set forth in claim 26, wherein the dot, the maximum size of which is limited to the predetermined size, corresponding to the pixel which corresponds to the specific one of the characteristics has the maximum size if the density of the pixel is equal to or more than a predetermined density.

* * * * *